(12) United States Patent
Kawasaki

(10) Patent No.: US 11,722,604 B2
(45) Date of Patent: Aug. 8, 2023

(54) IMAGE INSPECTION APPARATUS, IMAGE INSPECTION METHOD, AND NON-TRANSITORY COMPUTER-READABLE MEDIUM FOR INDICATING AREAS TO BE INSPECTED AND AREAS EXEMPT FROM INSPECTION

(71) Applicant: KONICA MINOLTA, INC., Tokyo (JP)

(72) Inventor: Tetsu Kawasaki, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/719,766

(22) Filed: Apr. 13, 2022

(65) Prior Publication Data

US 2022/0321705 A1 Oct. 6, 2022

Related U.S. Application Data

(63) Continuation of application No. 16/848,918, filed on Apr. 15, 2020, now Pat. No. 11,375,067.

(30) Foreign Application Priority Data

Apr. 17, 2019 (JP) .................................. 2019-078856

(51) Int. Cl.
*H04N 1/00* (2006.01)
(52) U.S. Cl.
CPC ..... *H04N 1/00037* (2013.01); *H04N 1/00005* (2013.01); *H04N 1/00461* (2013.01)

(58) Field of Classification Search
None
See application file for complete search history.

(56) References Cited

U.S. PATENT DOCUMENTS

| 2009/0202134 A1 | 8/2009 | Kano et al. |
| 2013/0016382 A1 | 1/2013 | Kitajima |

(Continued)

FOREIGN PATENT DOCUMENTS

| JP | H10222676 A | 8/1998 |
| JP | H10269359 A | 10/1998 |

(Continued)

OTHER PUBLICATIONS

Japanese Office Action dated Mar. 22, 2022 issued by the Japanese Patent Office in corresponding Japanese Patent Application No. 2019-078856 with English Translation. (23 Pages).

(Continued)

*Primary Examiner* — Andrew H Lam
(74) *Attorney, Agent, or Firm* — Buchanan Ingersoll & Rooney PC

(57) ABSTRACT

An image inspection apparatus is provided to allow a user to check a really-inspected area. The image inspection apparatus includes an image scanning unit to scan an image on a paper, an abnormality detector to determine whether or not a printing result is normal based on the image scanned by the image scanning unit, a storage unit to store information on an area to be inspected by the abnormality detector, and a display processor to indicate the area to be inspected by the abnormality detector in the image scanned by the image scanning unit.

25 Claims, 16 Drawing Sheets

(56) References Cited

U.S. PATENT DOCUMENTS

| | | | |
|---|---|---|---|
| 2013/0321517 A1* | 12/2013 | Kubota | G03G 15/6538 347/19 |
| 2014/0160534 A1* | 6/2014 | Nakamura | H04N 1/00795 358/3.24 |
| 2014/0300918 A1 | 10/2014 | Kiriyama | |
| 2016/0085484 A1 | 3/2016 | Ichikawa et al. | |
| 2017/0295293 A1* | 10/2017 | Oki | H04N 1/00005 |
| 2018/0293732 A1 | 10/2018 | Oki | |
| 2020/0336605 A1 | 10/2020 | Kawasaki | |

FOREIGN PATENT DOCUMENTS

| | | | |
|---|---|---|---|
| JP | 2004045228 A | 2/2004 | |
| JP | 2005217931 A | 8/2005 | |
| JP | 2007043489 A | 2/2007 | |
| JP | 2009157861 A | 7/2009 | |
| JP | 2012206461 A | 10/2012 | |
| JP | 2014202923 A | 10/2014 | |
| JP | 2015149517 A | 8/2015 | |
| JP | 2016062405 A | 4/2016 | |
| JP | 2017191979 A | 10/2017 | |

OTHER PUBLICATIONS

Office Action (Decision of Refusal) dated May 17, 2022, in corresponding Japanese Patent Application No. 2019-078856 and English translation of the Office Action. (20 pages).

* cited by examiner

IMAGE INSPECTION APPARATUS, IMAGE INSPECTION METHOD, AND NON-TRANSITORY COMPUTER-READABLE MEDIUM FOR INDICATING AREAS TO BE INSPECTED AND AREAS EXEMPT FROM INSPECTION

CROSS-REFERENCE TO RELATED APPLICATION

This application claims the benefit of priority to Japanese Patent Application No. 2019-078856 filed on 17 Apr. 2019, the disclosures of all of which are hereby incorporated by reference in their entireties.

TECHNICAL FIELD

The present invention relates to an image inspection device, an image inspection method, and a non-transitory computer-readable medium used for image inspection.

BACKGROUND OF THE INVENTION

An automatic inspection function in printing business is a function of comparing a scanned result of an output material to be inspected to a correct image associated therewith in advance, identifying defective printed material having such as dirt, dog ears, wrinkles, or print skew, and automatically discharging the defective printed material as a spoiled paper to another tray. Here, the correct image is generated from a result of scanning the original copy or an output from a print job for generating the correct image.

There is a problem, if the inspection is always executed over the entire image during image inspection, that although there is no abnormality in the area to be inspected, abnormality in an area exempt from inspection may lead to a printed material being identified as defective. Therefore, the area to be inspected is generally specified and such a control is made that no inspection is made for any abnormal image in an area exempt from inspection.

In addition, there is a known technique, as disclosed in Japanese Patent Application Publication No. 2017-191979 A (hereinafter referred to as Patent Document 1), in which an inspected scanned image is stored as an image file such as a PDF file, so that a user refers to the image file to directly check the inspection result. According to Patent Document 1, the user checks the result of the abnormality detection and the inspected real scanned image, and checks for and inputs erroneous detection and omission of detection, to provide feedback to the conditions for detecting abnormality during automatic inspection.

SUMMARY OF THE INVENTION

Problems to be Solved

However, there are following problems a) to e) when a user checks an inspected image, because the user is unable to know the area inspected by the device.
a) When a printed material is inspected, it is impossible to check whether the inspected area is an area intended for inspection by the user.
b) If the area, for which the printed material needs be inspected, is not inspected, the final deliverable may be shipped with the abnormal image remaining uncorrected.
c) In addition, when an image defect visually detected by the user has not been detected by the device, it is impossible to determine whether it has not been detected because the image is outside the area to be inspected, or it has not been detected because no conditions (thresholds) for determining an abnormal image are met.
d) It is impossible to determine whether the inspected area of the print image needs to be corrected or the inspection condition needs to be corrected.
e) When visually checking the scanned result, the user cannot strictly recognize the inspected area, and therefore it is difficult to determine whether an image defect near the boundary for the trimmed area affects the final deliverable. Then, it is necessary to measure a distance from an edge of the image and compare it to a trimming amount.

The present invention is therefore intended to allow a user to check a really-inspected area.

Solution to Problem

That is, the above-identified problems are solved by the present invention with the following configurations.

1) An image inspection apparatus includes: an image scanning unit to scan an image on a paper; an abnormality detector to inspect whether or not a printing result is normal based on the image scanned by the image scanning unit; a storage unit to store information on an area to be inspected by the abnormality detector; and an area indicator to indicate the area to be inspected by the abnormality detector in the image scanned by the image scanning unit.

2) The image inspection apparatus, as described in 1), further includes an image processor to superimpose a graphic, indicating the area to be inspected or an area exempt from inspection, on an original image or the image scanned by the image scanning unit.

3) In the image inspection apparatus as described in 2), the image processor superimposes a graphic, indicating the area to be inspected or the area exempt from inspection, on the same layer as the original image, and associates the superimposed image with the original image for a management purpose.

4) In the image inspection apparatus as described in 2), the image processor, when superimposing the graphic indicating the area to be inspected on the original image, registers the graphic in a layer different from the original image.

5) In the image inspection apparatus as described in 3), the area indicator switches displaying the original image and displaying an image obtained by superimposing a graphic, indicating the area to be inspected or the area exempt from inspection, on the original image.

6) In the image inspection apparatus as described in 2), the area indicator displays the area to be inspected or the area exempt from inspection in a solid color, with respect to the image scanned by the image scanning unit.

7) In the image inspection apparatus as described in 2), the area indicator displays a boundary line between the area to be inspected and the area exempt from inspection, with respect to the image scanned by the image scanning unit.

8) In the image inspection apparatus as described in 2), the area indicator switches a way of indicating the area exempt from inspection, depending on a factor and/or condition to make the area be exempt from inspection.

9) The image inspection apparatus as described in 1) further includes a display processor to create an image indicating the area to be inspected by the abnormality detector.

10) The image inspection apparatus as described in 1) further includes a trimmer to generate an image obtained by trimming an area exempt from inspection from the image scanned by the image scanning unit.

11) The image inspection apparatus as described in 1) further includes a storage unit to store information on the area to be inspected or an area exempt from inspection, along with the image scanned by the image scanning unit.

12) In the image inspection apparatus as described in 11), the storage unit stores information on the area to be inspected or the area exempt from inspection with characters so as to be superimposed on the image scanned by the image scanning unit.

13) In the image inspection apparatus as described in 11), the storage unit stores an image scanned by the image scanning unit, and stores information on the area to be inspected or the area exempt from inspection in association with the image.

14) The image inspection apparatus as described in 1) further includes a corrector to correct the area to be inspected or an area exempt from inspection, which has abnormality detected by the abnormality detector.

15) In the image inspection apparatus as described in any one of 1) to 14), a/the area exempt from inspection by the abnormality detector includes an area to be trimmed from a recording medium having the image printed thereon.

16) In the image inspection apparatus as described in any one of 1) to 14), an/the area exempt from inspection by the abnormality detector includes an area having different print contents for each recording medium.

17) An image inspection method includes: scanning, by an image scanning unit, an image on a paper; determining, by an abnormality detector, whether or not a printing result is normal based on the image scanned by the image scanning unit; storing information on an area to be inspected by the abnormality detector in a storage unit; and indicating, by an area indicator, the area to be inspected by the abnormality detector in the image scanned by the image scanning unit.

18) A non-transitory computer-readable medium stores computer-executable instructions for image inspection, which, when executed by a processor, cause the processor to perform operations including: scanning, by an image scanning unit, an image on a paper; determining whether or not a printing result is normal based on the image scanned by the image scanning unit; storing information on an area to be inspected in a storage unit; and indicating, by an area indicator, the area to be inspected in the image scanned by the image scanning unit.

Advantageous Effects of the Invention

The present invention allows a user to check a really-inspected area.

EMBODIMENTS OF THE INVENTION

Figure 1:
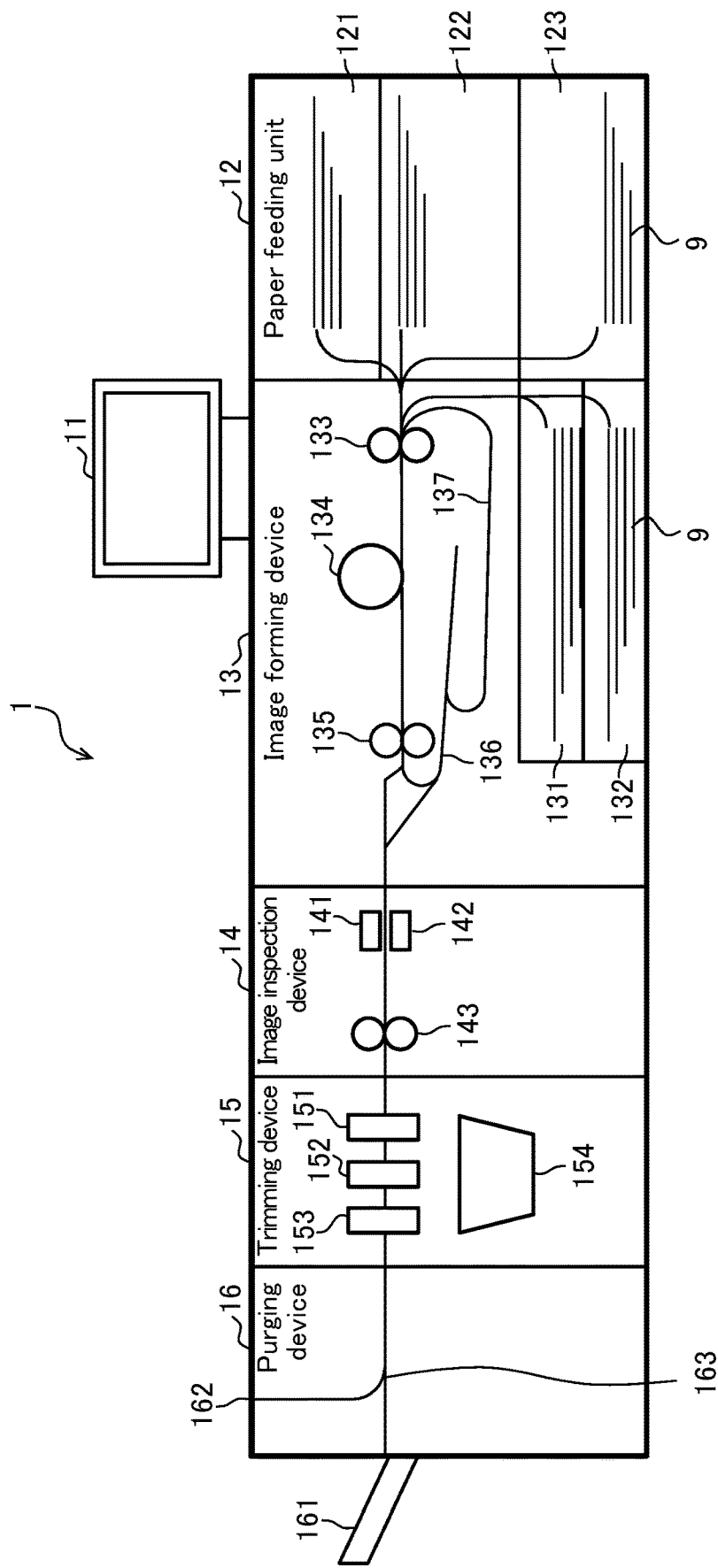
FIG. 1 is a diagram to show a schematic configuration of an image forming system according to present embodiments.
Figure 2:
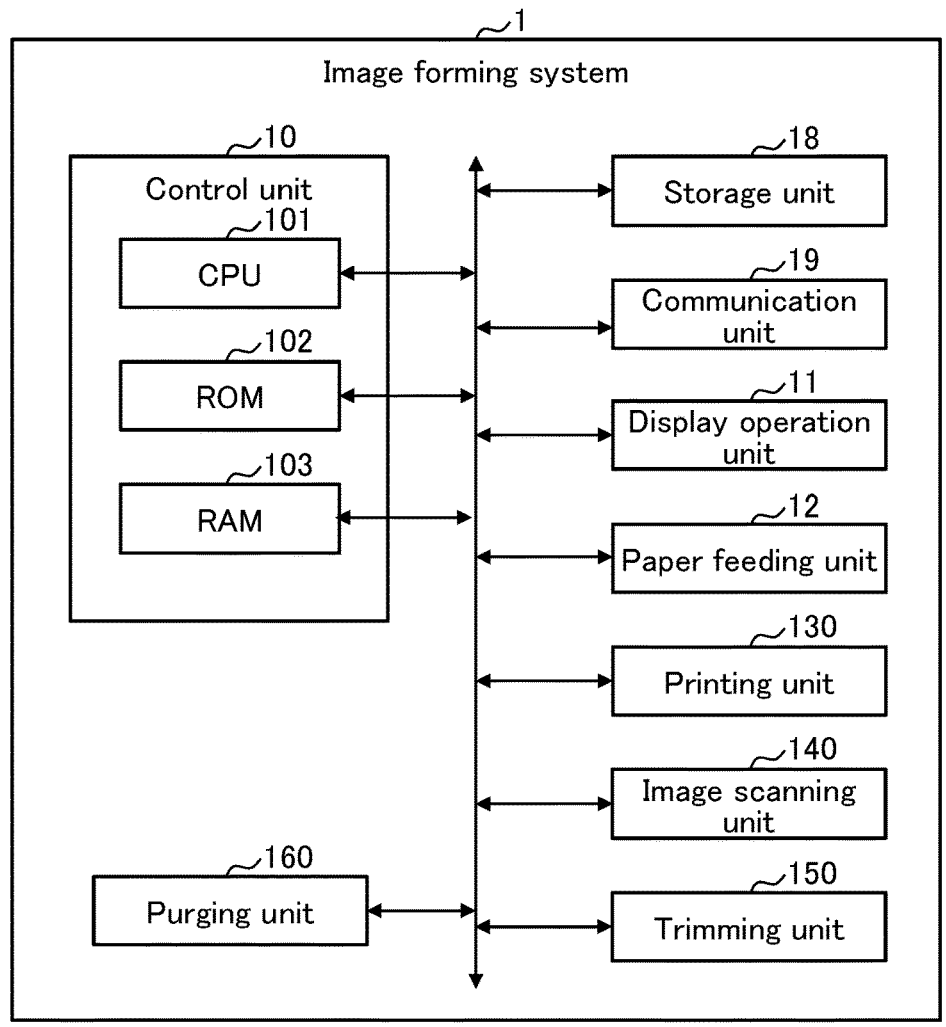
FIG. 2 is a block diagram of the image forming system.

Hereinafter, embodiments of the present invention are described in detail, with reference to the drawings. FIG. 1 is a diagram to show a schematic configuration of an image forming system 1 of the present embodiment. FIG. 2 is a block diagram of the image forming system 1.

The image forming system 1 includes a display operation unit 11, a paper feeding unit 12, an image forming device 13, an image inspection device 14, a trimming device 15, and a purging device 16, as shown in FIG. 1. The paper feeding unit 12, the image forming device 13, the image inspection device 14, the trimming device 15, and the purging device 16 are connected in order from the upstream to the downstream in transporting the paper.

The image forming system 1 includes a control unit 10, the display operation unit 11, the paper feeding unit 12, a printing unit 130, an image scanning unit 140, a trimming unit 150, a purging unit 160, a storage unit 18, and a communication unit 19 as shown in FIG. 2. These are interconnected via a bus or interface to exchange signals.

The control unit 10 includes a CPU (Central Processing Unit) 101, a ROM (Read Only Memory) 102, and a RAM (Random Access Memory) 103. The CPU 101 controls the above-described units and executes various arithmetic processing according to one or more programs. The ROM 102 is a non-volatile memory to store various programs and various data for controlling the devices of the image forming system 1. The RAM 103 is a volatile memory to temporarily store programs and data as a working area for the CPU 101.

The storage unit 18 is a large-capacity storage device, such as a hard disk, to store various programs and various data. The CPU 101, the ROM 102, and the RAM 103 constitutes a computer to execute the programs stored in the storage unit 18 for executing processing in processes. The communication unit 19 is an interface to communicate with another system.

The display operation unit 11 is an operation panel including a touch panel, a numeric keypad, a start button, and a stop button, and is used for displaying various information and inputting various instructions.

<Paper Feeding Unit>

The paper feeding unit 12 includes a plurality of large-capacity paper feeding stages 121 to 123. The large-capacity paper feeding stages 121 to 123 store papers 9 used for image formation. The paper feeding unit 12 sends out the papers 9 stored in the large-capacity paper feeding stages 121 to 123 to the image forming device 13 one by one.

<Image Forming Device>

The image forming device 13 includes inside paper feeding stages 131 and 132, a transport roller 133, a transfer roller 134, a fixing roller 135, and reversing paths 136 and 137, to be configured as the printing unit 130 in FIG. 2. The inside paper feed stages 131 and 132 store papers 9 used for image formation. The transport roller 133 transports the papers 9 transported from the inside paper feed stages 131 and 132 and the paper feeding unit 12, one by one, to the downstream.

The transfer roller 134 is installed on the downstream of the transport roller 133 and transfers toner images in CMYK colors onto the paper 9. The fixing roller 135 heats and presses the paper 9 to fix the toner images transferred onto the paper 9. The reversing paths 136 and 137 are paths to reverse the paper 9 discharged from the fixing roller 135 and resend the paper 9 to the transport roller 133. This allows the image forming device 13 to print on both sides of the paper 9.

The printing unit 130 uses a popular image forming process, such as an electrophotographic process, including the steps of charging, exposing, developing, transferring, and fixing, to form an image derived from the image data on the paper 9. The paper 9 having the image formed by the printing unit 130 is transported to the image inspection device 14 installed downstream.

<Image Inspection Device>

The image inspection device 14 includes optical sensors 141 and 142, and a roller 143. The optical sensors 141 and 142 are configured as the image scanning unit 140 in FIG. 2.

The image scanning unit 140 scans the image formed on the paper 9 to obtain scanned image data. The optical sensors 141 and 142 of the image scanning unit 140 are imaging devices such as CCD (Charge Coupled Device) image sensors. The optical sensor 141 images the front surface of the paper 9. The optical sensor 142 images the back surface of the paper 9.

The image scanning unit 140 irradiates the paper 9 with light from a light source such as a fluorescent lamp, photo-electrically converts the reflected light into electric signals by the optical sensors 141 and 142, and generates scanned image data from the electric signals. The paper 9, from which the image is scanned by the image scanning unit 140, is sequentially transported to the trimming device 15 installed downstream.

<Trimming Device>

The trimming device 15 includes trimming cutters 151 to 153 and a waste bin 154, to be configured as a trimming unit 150 in FIG. 2. The trimming unit 150 trims the paper 9 having an image formed by the image forming device 13. The trimming unit 150 includes a trimming cutter 151 to trim the paper 9 in a direction along the transport direction, and trimming cutters 152, 153 to trim the paper 9 in a direction orthogonal to the transport direction, to trim the paper 9 in two directions. The trimming unit 150 trims the paper 9 based on trimming process information of the job, to cut out ends of the paper 9 and put the cut ends into the waste bin 154. The paper obtained by trimming the paper 9 by the trimming unit 150 is sequentially transported to the purging device 16 installed downstream.

<Purging Device>

The purging device 16 includes a main catch tray 161 provided on a side surface of a main body of the device and a sub catch tray 162 provided on an upper part of the main body of the device, to be configured as a purging unit 160 in FIG. 2. The purging unit 160 discharges the paper trimmed by the trimming device 15. The purging unit 160 of the present embodiment has the main catch tray 161 provided on the side surface of the main body of the device, and the sub catch tray 162 provided on the upper part of the main body of the device.

A transport path switching unit 163 switches the transport path of the trimmed paper between a first transport path directed to the main catch tray 161 and a second transport path directed to the sub catch tray 162. If no abnormality is found in the paper 9 before trimming, the transport path switching unit 163 transports the cut paper to the first transport path, to discharge the cut paper to the main catch tray 161. If any abnormality is found in the paper 9 before trimming, the transport path switching unit 163 transports the cut paper to the second transport path, to discharge (or purge) the paper to the sub catch tray 162.

Figure 3:
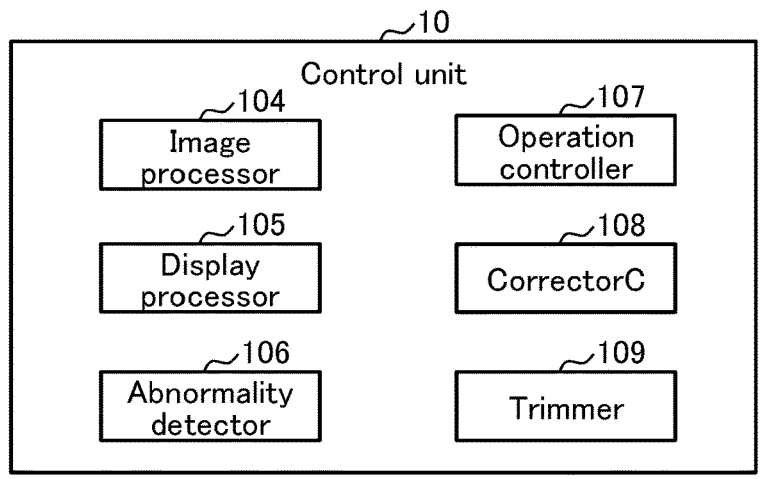
FIG. 3 is a block diagram of a controller.

The control unit 10 of the image forming system 1 works as the purging unit 160 to discharge the normal paper 9 to the main catch tray 161 and discharge an abnormal paper to the sub catch tray 162, in cooperation with a control unit (not shown) of the purging device 16. In addition, the control unit 10 of the image forming system 1 works as an operation controller 107 (see FIG. 3) to control operation of the image forming system 1, in cooperation with control units (not shown) of the image inspection device 14, trimming device 15, and purging device 16.

Further, the control unit 10 of the image forming system 1 executes the program stored in the storage unit 18 to work as an image processor 104, a display processor 105, an abnormality detector 106, the operation controller 107, a corrector 108, and a trimmer 109. Here, the image processor 104 processes the image data on the paper 9 scanned by the image scanning unit 140. The image processor 104 superimposes a graphic, indicating an area to be inspected or an area exempt from inspection, on the original image scanned by the image scanning unit 140. This allows the user to check the really-inspected area. The image processor 104 may register a graphic indicating an area to be inspected or an area exempt from inspection, as a layer, in the original image. Alternatively, the image processor may associate an image having a graphic, indicating an area to be inspected or an area exempt from inspection, drawn thereon with the original image, for a management purpose.

The display processor 105 displays the image data on the paper 9 obtained by the image scanning unit 140 on the display operation unit 11 or the like. In addition, the display processor 105 may mechanically switch at a predetermined cycle between displaying a graphic indicating an area to be inspected or an area exempt from inspection so as to be superimposed on the original image scanned by the image scanning unit 140, and not displaying the graphic. As a result, the display processor 105 works as an area indicator to indicate the image data on the paper 9 obtained by the image scanning unit 140.

The abnormality detector 106 detects abnormality from the image data on the paper 9 obtained by the image scanning unit 140, and thus detects whether the print result is normal. The operation controller 107 controls a series of image forming operation, in cooperation with the devices in the image forming system 1. The corrector 108 allows the user to correct the area to be inspected or the area exempt from inspection, in cooperation with the display processor 105. The trimmer 109 uses the image processor 104 to trim the area exempt from inspection from the scanned image. Specific operations by the respective processors are described below.

The image forming system 1, the trimming device 15, the image inspection device 14, and the purging device 16 may each include one or more components other than those described above, or may have some of those described above excluded.

In the image forming system 1 configured as described above, the papers 9 each having the image formed by the printing unit 130 are sequentially inspected by the image inspection device 14, and the images on the papers 9 are inspected. Hereinbelow, the operation of the image inspection device 14 is described in detail, with reference to FIGS. 4 to 23.

First Embodiment

Figure 4:
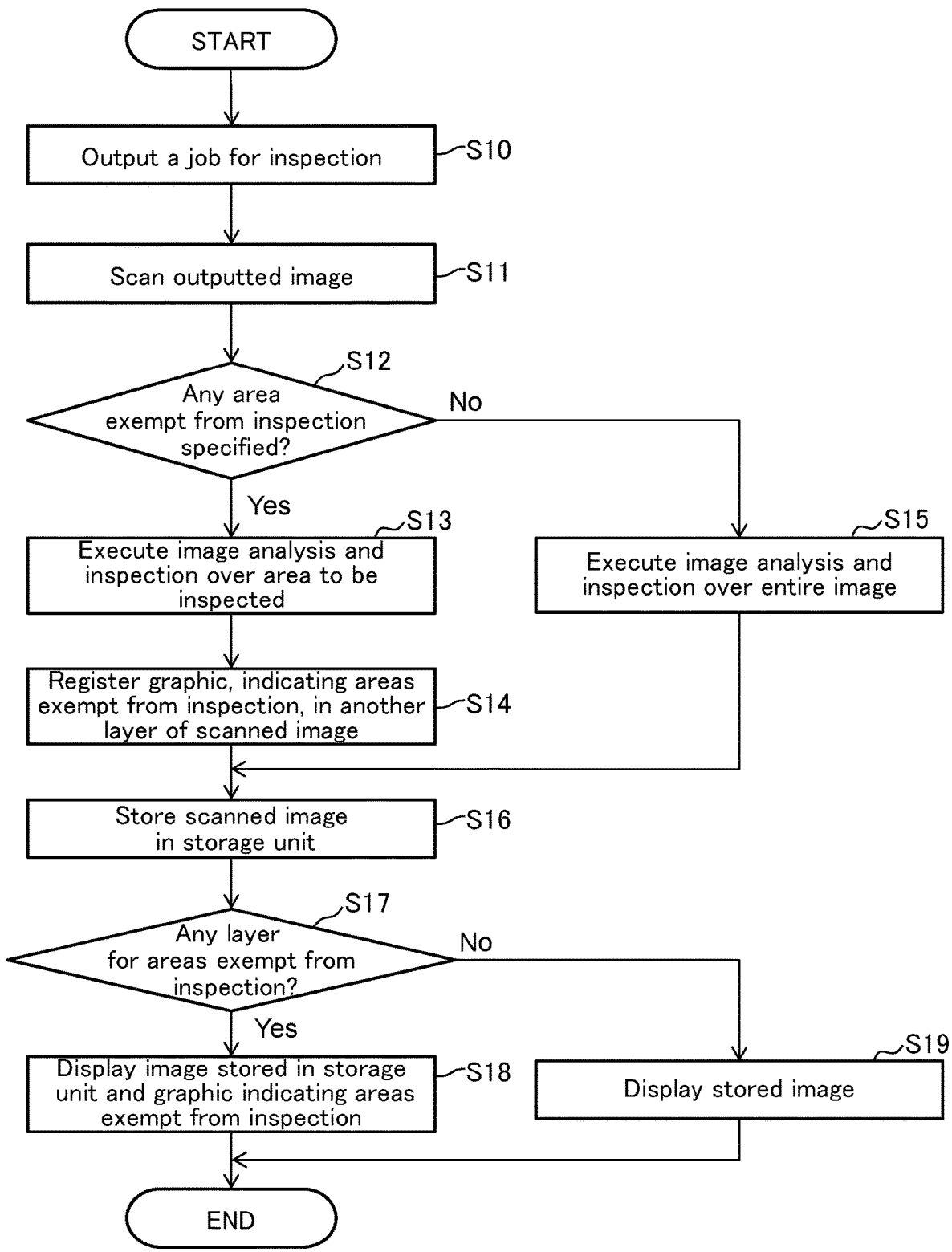
FIG. 4 is a flowchart of a process to switch between displaying a graphic indicating an area exempt from inspection so as to be superimposed on an image obtained by scanning a recording medium, and not displaying the graphic.

FIG. 4 is a flowchart of a process to switch between displaying a graphic indicating an area exempt from inspection so as to be superimposed on an image obtained by scanning a recording medium, and not displaying the graphic. First, the control unit 10 uses the printing unit 130 to output a job for inspection on the paper 9 (S10), and uses the image scanning unit 140 to scan the image outputted on the paper 9 (S11). Next, the control unit 10 determines whether or not any area exempt from inspection is specified in the job for inspection (S12).

If no area exempt from inspection is specified in the job for inspection (No), the control unit 10 uses the abnormality detector 106 to execute image analysis and inspection over the entire image (S15), and to store the scanned image in the storage unit 18 (S16).

If any area exempt from inspection is specified in the job for inspection (Yes), the control unit 10 uses the abnormality detector 106 to execute image analysis and inspection over the area to be inspected (S13), and uses the image processor 104 to register a graphic, indicating the area exempt from inspection, in another layer of the scanned image (S14). In addition, the control unit 10 stores the scanned image in the storage unit 18 (S16).

The control unit 10 then uses the display processing unit 105 to determine whether or not the layer for the area exempt from inspection is registered in the stored image (S17). If the layer for the area exempt from inspection is registered in the stored image (Yes), the control unit 10 displays the image stored in the storage unit 18, while mechanically switching, at a predetermined cycle, between displaying the layer for the area exempt from inspection over the image, and not displaying the layer (S18), and ends the processing in FIG. 4. That is, the control unit 10 switches, at a predetermined cycle, between displaying the image obtained by scanning the printed paper 9 and displaying the image having the graphic indicating the area exempt from inspection superimposed on the scanned image. This allows the user, when checking the image obtained by scanning the printed paper 9, to check the really-inspected area.

If no layer is registered in the stored image for a graphic of the area exempt from inspection (No), the control unit 10 uses the display processor 105 to display the stored image (S19), and ends the process in FIG. 4.

Figure 5:
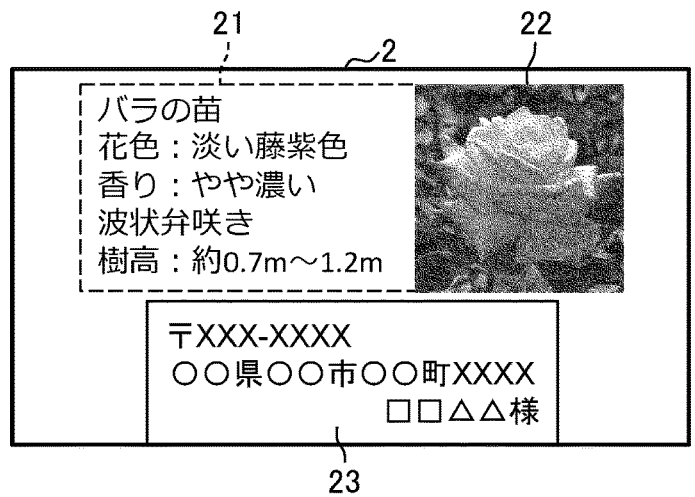
FIG. 5 is an example of an image obtained by scanning a printed recording medium.

FIG. 5 is an example of an image 2 obtained by scanning a printed recording medium. The image 2 includes a text area 21, a photograph area 22, and a variable area 23 having an address and the like. The text area 21 is an area where a text is printed. The photograph area 22 is an area where a photograph is printed. The variable area 23 is a variable area where different contents are printed for the every paper 9. In contrast, the text area 21 or the photograph area 22 is an invariable area whose contents remain the same even for the different paper 9, and are thus specified as the area to be inspected.

Figure 6:
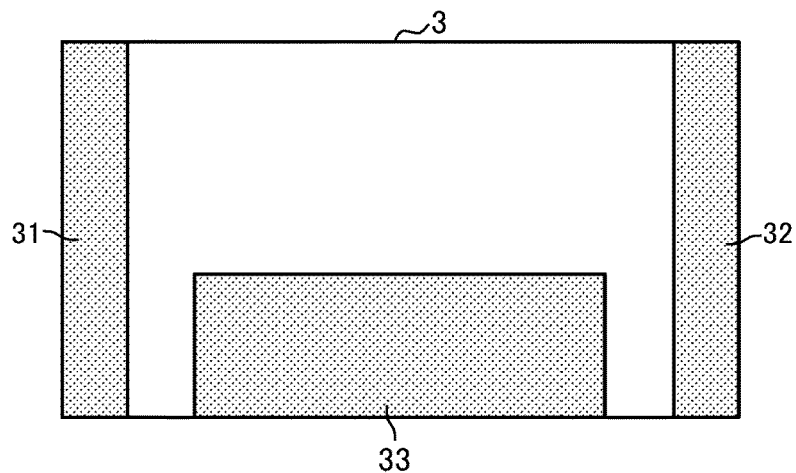
FIG. 6 is a diagram to show a layer of an area exempt from inspection.

FIG. 6 is a diagram to show a layer 3 of the area exempt from inspection. Here, the layer 3 is a layer added to the image 2. The layer 3 includes a trimmed area 31 at the left end, a trimmed area 32 at the right end, and a variable area 33 at the lower center. In the layer 3, the trimmed areas 31, 32 and variable area 33 indicated by hatching are opaque. The other areas without hatching are transparent.

Figure 7:
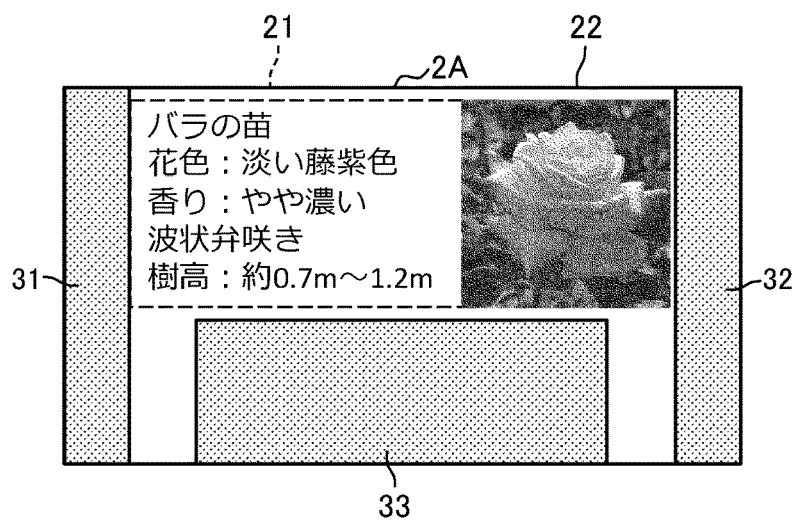
FIG. 7 is a diagram to show an image obtained by superimposing the area exempt from inspection on the image obtained by scanning the recording medium.

FIG. 7 is a diagram to show an image 2A obtained by superimposing the area exempt from inspection on the image 2 obtained by scanning the recording medium. The image 2A includes the text area 21, the photograph area 22, the trimmed areas 31, 32, and the variable area 33. The trimmed areas 31, 32 and the variable area 33 are not areas to be inspected. That is, the image 2A is obtained by superimposing the area exempt from inspection on the image 2 in FIG. 5.

Figure 8:
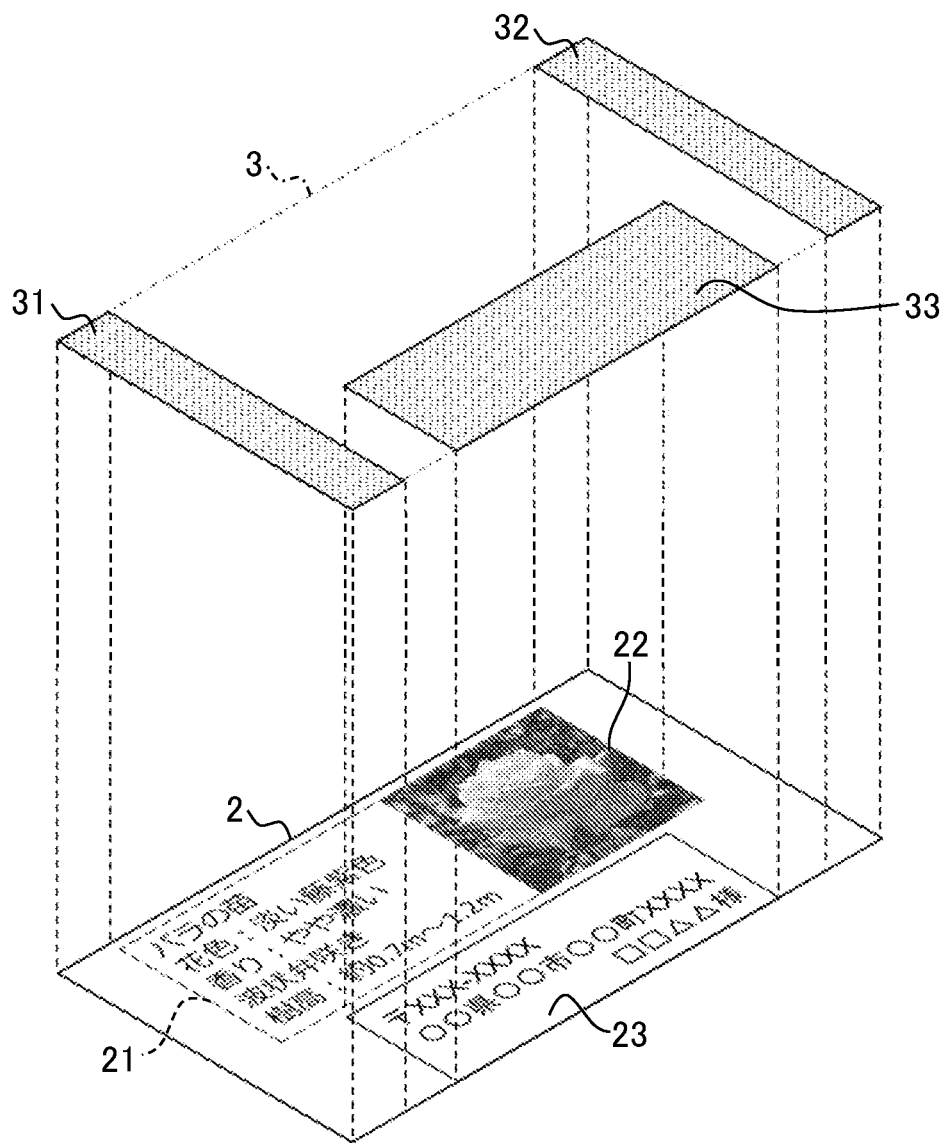
FIG. 8 is a diagram to show a structure of a file having the area exempt from inspection registered as another layer of the image obtained by scanning the printed recording medium.

FIG. 8 is a diagram to show a structure of a file, having the area exempt from inspection, registered as another layer of the image obtained by scanning the printed recording medium. The layer 3 is positioned as an upper layer of the image 2 obtained by scanning the printed recording medium. The layer 3 may be displayed as the upper layer of the image 2, to display the image 2A (see FIG. 7) having the graphic for the area to be inspected superimposed on the scanned image 2. The layer 3 may not be displayed, to display the scanned image 2 (see FIG. 5) itself. Mechanically switching, at a predetermined cycle, between displaying the image 2A and displaying the image 2 in this manner allows the user to visually recognize the area to be inspected in the scanned image, and further to visually recognize the area exempt from inspection.

Allowing the user to visually recognize the area to be inspected in the scanned image leads to preventing erroneous detection or oversight of an abnormal image due to mismatch of the area exempt from inspection. Additionally, when the user checks the scanning result of the image for inspection, the user can identify the area exempt from inspection, to facilitate the checking activity.

Note that the scanned image, the image indicating the area to be inspected, and the image obtained by superimposing the graphic of the area to be inspected on the scanned image may be stored in a state of being associated with one another, to allow the user to refer to, compare, or superimpose the respective images depending on application.

Second Embodiment

Figure 9:
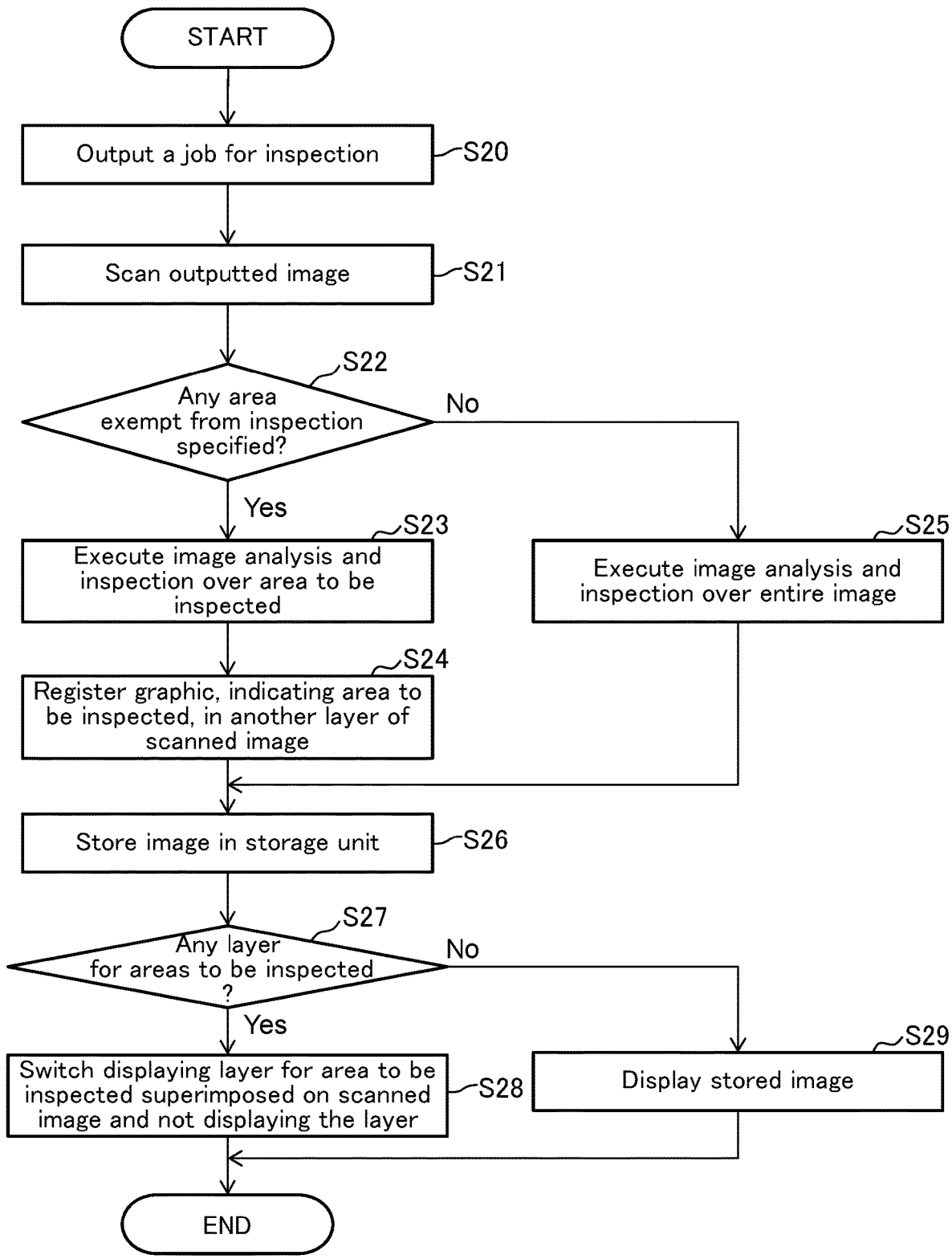
FIG. 9 is a flowchart of a process to switch between displaying a graphic indicating an area to be inspected so as to be superimposed on an image obtained by scanning a recording medium, and not displaying the graphic.

In order for the user to check the really-inspected area, displaying the image obtained by scanning the recording medium may be switched with displaying the image indicating the area exempt from inspection. FIG. 9 is a flowchart of a process to switch between displaying a graphic indicating the area to be inspected so as to be superimposed on the scanned image obtained by scanning the recording medium and not displaying the graphic. First, the control unit 10 uses the printing unit 130 to output the job for inspection on the paper 9 (S20), and uses the image scanning unit 140 to scan the image outputted on the paper 9 (S21). Next, the control unit 10 determines whether or not any area exempt from inspection is specified in the job for inspection (S22).

If no area exempt from inspection is specified in the job for inspection (No), the control unit 10 uses the abnormality detector 106 to execute image analysis and inspection over the entire image (S25), and proceeds to processing in step S26.

If any area exempt from inspection is specified in the job for inspection (Yes), the control unit 10 uses the abnormality detector 106 to execute image analysis and inspection over the area to be inspected (S23), uses the image processor 104 to register the graphic indicating the area to be inspected in another layer of the scanned image (S24), and proceeds to processing in step S26.

In step S26, the control unit 10 stores the image in the storage unit 18. Then, the control unit 10 uses the display processor 105 to determine whether or not the graphic of the area to be inspected is registered as a layer in the stored image (S27). If any graphic of the area to be inspected is registered in the stored image (Yes), the control unit 10 displays the image stored in the storage unit 18, while mechanically switching, at a predetermined cycle, between displaying the graphic (rectangle) indicating the area to be inspected so as to be superimposed on the image and not displaying the graphic (S28), and ends the process in FIG. 9. Thus, the image obtained by scanning the printed paper 9 and the area to be inspected are displayed so as to be visually recognizable. If any graphic of the area to be inspected is not registered in the stored image (No), the control unit 10 displays the stored image (S29), and then ends the process in FIG. 9.

Figure 10:
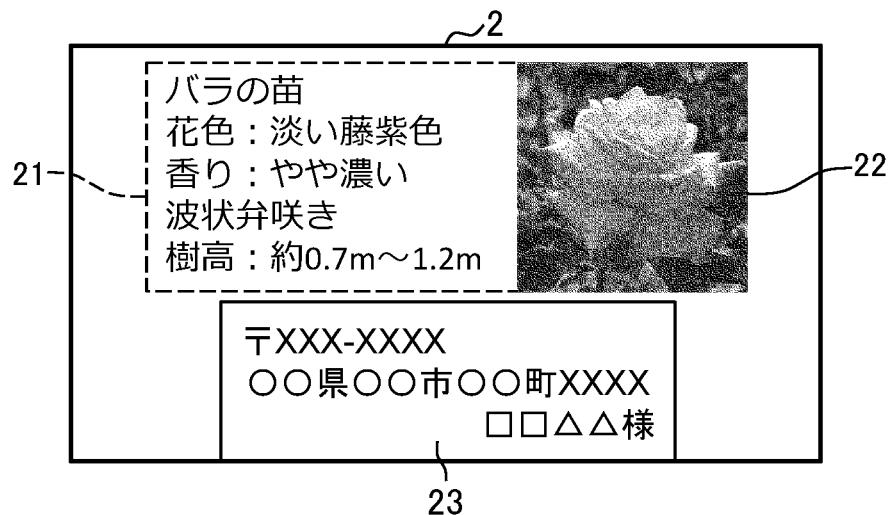
FIG. 10 is an example of an image obtained by scanning a printed recording medium.
Figure 11:
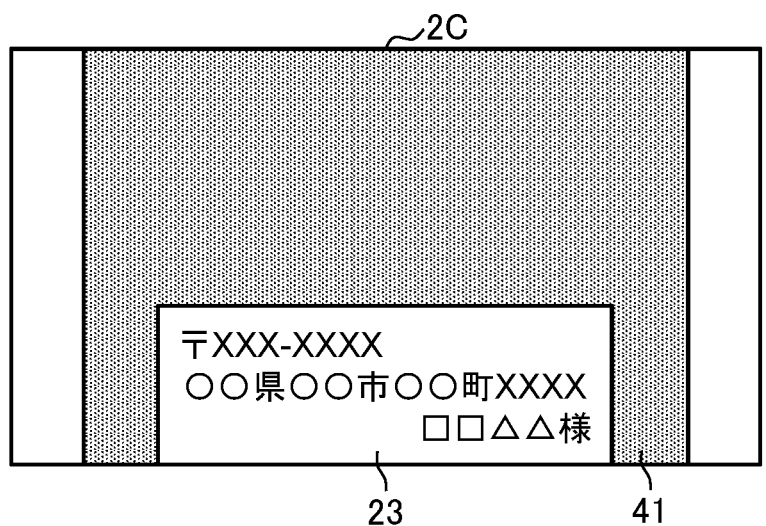
FIG. 11 is a diagram to show an area to be inspected.

FIG. 10 is an example of the image 2 obtained by scanning the printed recording medium. FIG. 11 shows an image 2C displaying the graphic for the area to be inspected so as to be superimposed on the scanned image. The image 2 includes the text area 21, the photograph area 22, and the variable area 23 having an address and the like. In contrast, the image 2C displays an area to be inspected 41 in an inverted U-shape, and the variable area 23 at the lower center.

Figure 12:
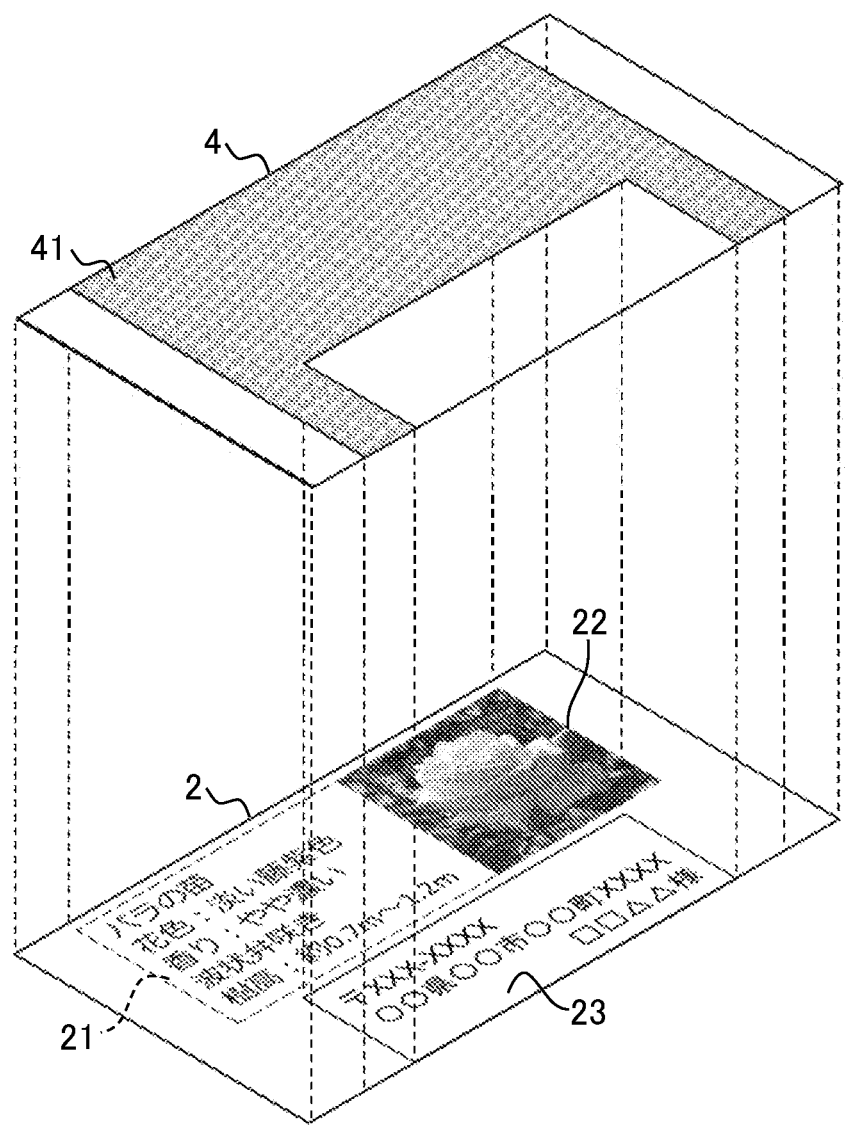
FIG. 12 is a diagram to show a structure of a file having an area to be inspected registered as another layer of an image obtained by scanning a printed recording medium.

FIG. 12 is a diagram to show a file having an area to be inspected registered as another layer of an image obtained by scanning a printed recording medium. A layer 4 is positioned as an upper layer of the image 2 obtained by scanning the printed recording medium. The layer 4 includes an area to be inspected 41 in an inverted U-shape. In the layer 4, the area to be inspected 41 indicated by hatching is opaque. The other areas without hatching are transparent.

The layer 4 may be displayed as the upper layer of the image 2, to display the image 2C (see FIG. 11) having the graphic of the area 41 to be inspected superimposed on the scanned image 2. The layer 4 may not be displayed, to display the scanned image 2 (see FIG. 10) itself. Mechanically switching, at a predetermined cycle, between displaying the image 2C and displaying the image 2 in this manner allows the user to visually recognize the area to be inspected in the scanned image, and further to visually recognize the area exempt from inspection.

Third Embodiment

In order for the user to check the really-inspected area, a boundary line for the area to be inspected may be displayed on an image obtained by scanning the recording medium.

Figure 13:
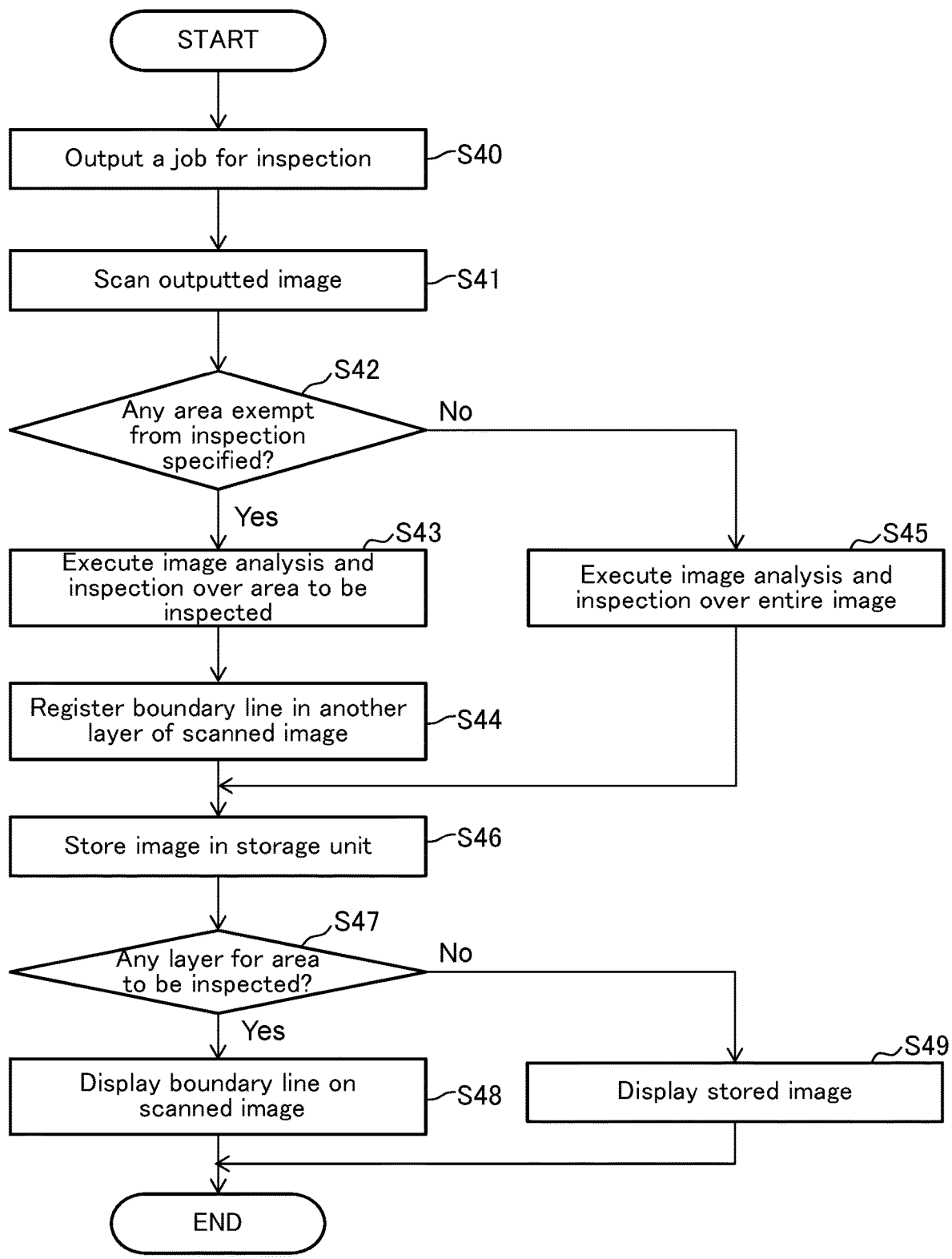
FIG. 13 is a flowchart of a process to display boundary lines between an area to be inspected and an area exempt from inspection so as to be superimposed on an image obtained by scanning a recording medium.

FIG. 13 is a flowchart of a process to display boundary lines between an area to be inspected and an area exempt from inspection so as to be superimposed on an image obtained by scanning a recording medium. First, the control unit 10 uses the printing unit 130 to output a job for inspection on the paper 9 (S40), and uses the image scanning unit 140 to scan the image outputted on the paper 9 (S41). Next, the control unit 10 determines whether or not any area exempt from inspection is specified in the job for inspection (S42).

If no area exempt from inspection is specified in the job for inspection (No), the control unit 10 uses the abnormality detector 106 to execute image analysis and inspection over the entire image (S45), and proceeds to processing in step S46.

If any area exempt from inspection is specified in the job for inspection (Yes), the control unit 10 uses the abnormality detector 106 to execute image analysis and inspection over the area to be inspected (S43), and the image processor 104 to register the boundary lines between the area to be inspected and the area exempt from inspection in another layer of the scanned image (S44), and proceeds to processing in step S46.

In step S46, the control unit 10 stores the image in the storage unit 18. Then, the control unit 10 uses the display processor 105 to determine whether or not the boundary lines between the area to be inspected and the area exempt from inspection are registered as a layer in the stored image (S47). If the boundary lines for the area to be inspected are registered as a layer in the stored image (Yes), the control unit 10 displays the boundary lines for the area to be inspected on the image stored in the storage unit 18 (S48), and ends the process in FIG. 13. Thus, the image obtained by scanning the printed paper 9 and the area to be inspected are displayed so as to be visually recognizable. If the graphic of the area to be inspected is not registered in the stored image (No), the control unit 10 displays the stored image (S49), and ends the process in FIG. 13.

Figure 14:
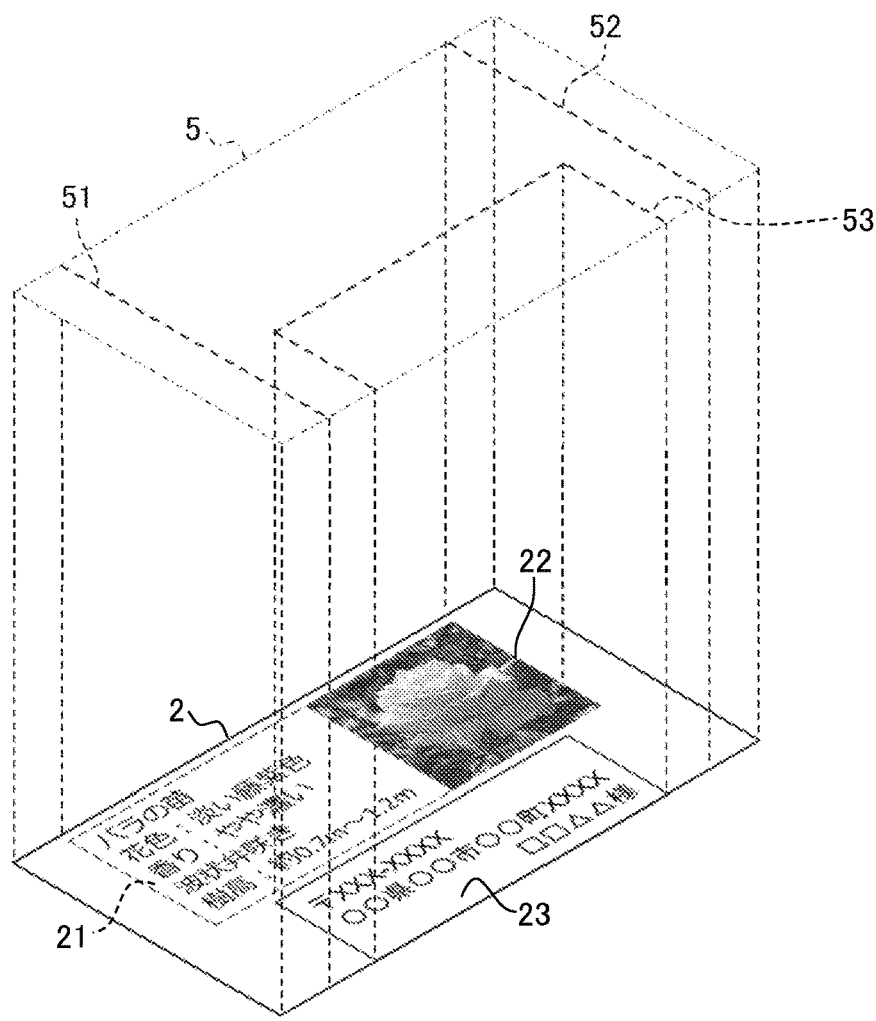
FIG. 14 is a diagram to show a file having the boundary lines between the area to be inspected and the area exempt from inspection registered as another layer of the image obtained by scanning the recording medium.

FIG. 14 is a diagram to show a file having the boundary lines between the area to be inspected and the area exempt from inspection registered as another layer of the image obtained by scanning the recording medium. A boundary line layer 5 is positioned as an upper layer of the image 2 obtained by scanning the printed recording medium. The boundary line layer 5 includes boundary lines 51 to 53. The boundary line 51 indicates a boundary between the trimmed area at the left end and the area to be inspected. The boundary line 52 indicates a boundary between the trimmed area at the right end and the area to be inspected. The boundary line 53 indicates a boundary between the variable area at the lower center and the area to be inspected.

The boundary line layer 5 may be displayed as the upper layer of the image 2, to display an image 2B (see FIG. 15) having the boundary lines 51 to 53 superimposed on the scanned image 2. The boundary line layer 5 may not be displayed, to display the scanned image 2 itself. Displaying the image 2B in this manner allows the user to visually recognize the boundary between the area to be inspected and area exempt from inspection in the scanned image.

Figure 15:
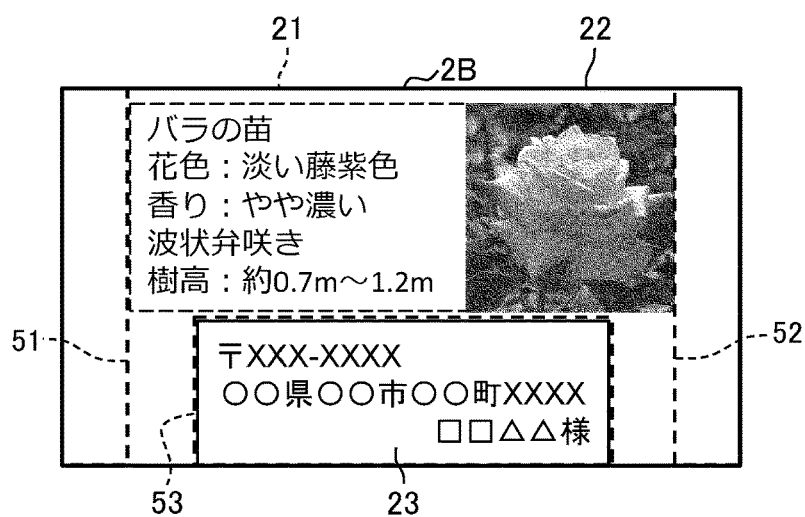
FIG. 15 is a diagram to show an image obtained by superimposing the boundary lines between the area to be inspected and the area exempt from inspection on the image obtained by scanning the recording medium.

FIG. 15 is a diagram to show an image obtained by superimposing the boundary lines 51 to 53 between the area to be inspected and area exempt from inspection on the image 2 obtained by scanning the recording medium. The image 2B includes the text area 21, the photograph area 22, and the variable area 23 having an address and the like. The boundary line 53 is displayed around the variable area 23. The boundary line 51 indicating the boundary for the trimmed area is displayed at the left end of the image 2B. The boundary line 52 indicating the boundary for the trimmed area is displayed at the right end of the image 2B.

Fourth Embodiment

A desirable one may be selected from among the ways of indicating areas as described above, depending on the actual application. For this reason, such a configuration is conceivable that a way of indicating an area is switched depending on a factor and/or condition to make the area be exempted from inspection.

Here, factors to make an area be exempted from inspection has an attribute indicating whether the area is a variable area, a trimmed area, a user-invisible area, or the like. Another factor is an attribute of whether the area is specified by the user or is automatically specified by the device. The condition to make an area be exempted from inspection is whether the area is an area to be inspected common to all pages or an area exempt from inspection specific to one or more designated pages.

In particular, for a user who does not want to check any trimmed areas but wants to visually check a variable area, such a configuration is desirable that the trimmed areas are displayed in a solid color and a boundary line is displayed for the variable area, so that one or more areas exempt from inspection are indicated.

Figure 16:
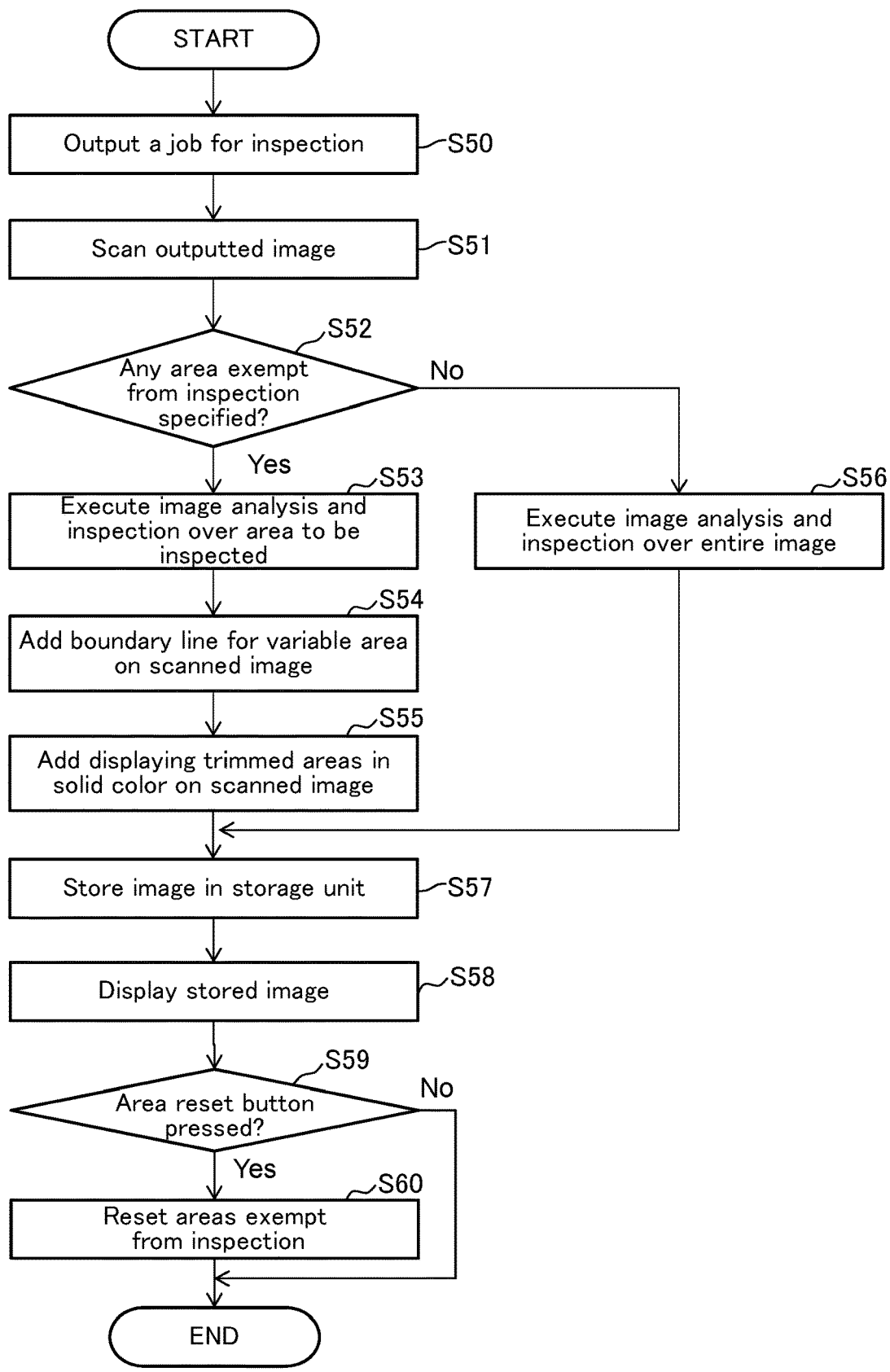
FIG. 16 is a flowchart of a process to display a boundary line for a variable area so as to be superimposed on the image obtained by scanning the recording medium, and to display trimmed areas in a solid color.

FIG. 16 is a flowchart of a process to display a boundary line for a variable area so as to be superimposed on an image obtained by scanning the recording medium, and to further display trimmed areas in a solid color. First, the control unit 10 uses the printing unit 130 to output the job for inspection on the paper 9 (S50), and uses the image scanning unit 140 to scan the image outputted on the paper 9 (S51). Next, the control unit 10 determines whether or not any area exempt from inspection is specified in the job for inspection (S52).

If no area exempt from inspection is specified in the job for inspection (No), the control unit 10 uses the abnormality detector 106 to execute image analysis and inspection over the entire image (S56), and proceeds to processing in step S57.

If any area exempt from inspection is specified in the job for inspection (Yes), the control unit 10 uses the abnormality detector 106 to execute image analysis and inspection over the area to be inspected (S53), uses the image processor 104 to add a boundary line for the variable area on the scanned image (S54) and to add displaying any trimmed areas in a solid color (S55), and proceeds to processing in step S57.

In step S57, the control unit 10 stores the image in the storage unit 18. Then, the control unit 10 uses the display processor 105 to display the stored image (S58), and proceeds to processing in step S58. Thus, the image obtained by scanning the printed paper 9 and the area to be inspected are displayed so as to be visually recognizable. Here, the control unit 10 displays an area-to-be-inspected screen 7 in FIG. 17.

Figure 17:
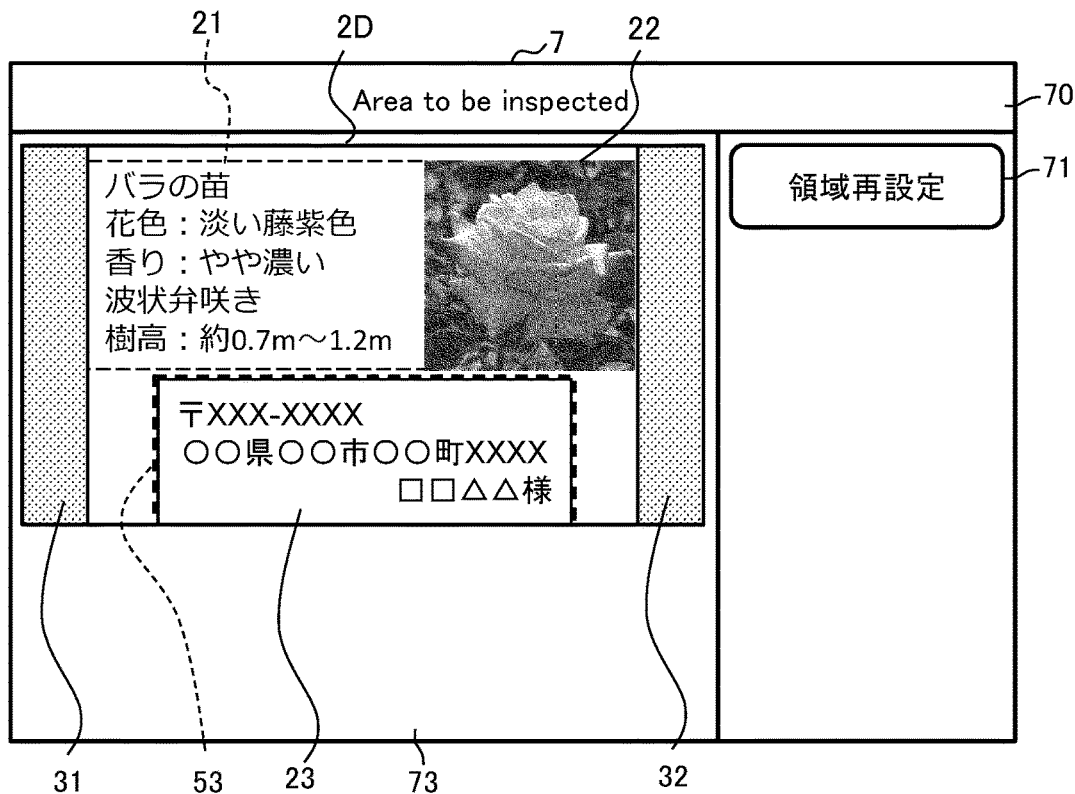
FIG. 17 is a diagram to show an area-to-be-inspected screen.

In step S59, the control unit 10 determines whether or not an area reset button 71 in FIG. 17 has been pressed. When the area reset button 71 is pressed (Yes), the control unit 10 uses the corrector 108 in FIG. 3 to reset an area exempt from inspection (S60), and ends the process in FIG. 16. If the area reset button 71 has not been pressed (No), the control unit 10 ends the process in FIG. 16.

FIG. 17 is a diagram to show the area-to-be-inspected screen 7. The area-to-be-inspected screen 7 has a wording "area to be inspected" displayed on a title bar 70, an image pane 73 displayed on the lower left, and an area reset button 71 displayed on the lower right. An image 2D is displayed in the image pane 73. The image 2D has the boundary 53 for the variable area 23 displayed and the trimmed areas 31, 32 displayed in a solid color. When the area reset button 71 is pressed on the area-to-be-inspected screen 7, the screen transitions to an area reset screen 7B in FIG. 18 for resetting one or more areas exempt from inspection.

Figure 18:
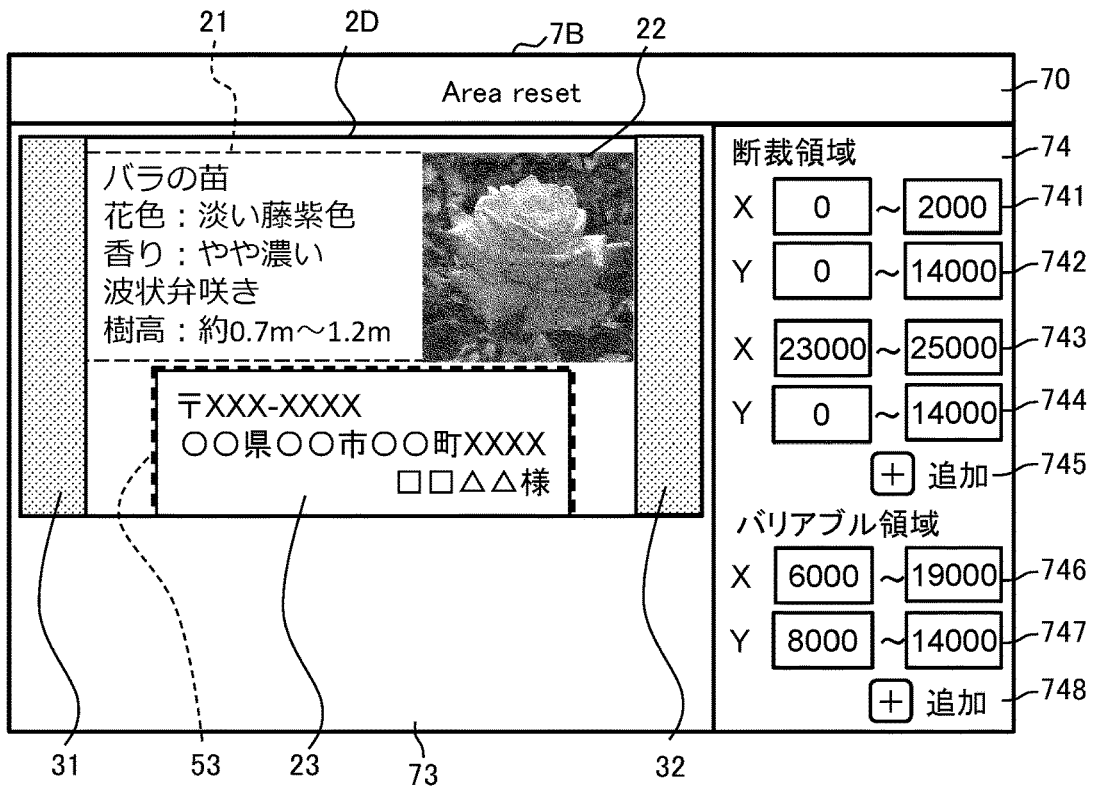
FIG. 18 is a diagram to show an area reset screen for resetting an area exempt from inspection.

FIG. 18 is a diagram to show the area reset screen 7B for resetting one or more areas exempt from inspection. The area reset screen 7B has a wording "area reset" displayed on the title bar 70, the image pane 73 displayed on the lower left, and an area information input pane 74 displayed on the lower right. The area reset screen 7B is displayed by the corrector 108 in FIG. 3. In the area information input pane 74, an X-axis coordinate text box 741 and a Y-axis coordinate text box 742, and an X-axis coordinate text box 743 and a Y-axis coordinate text box 744 for editing trimmed areas, and an add button 745 for adding a trimmed area are displayed. In the area information input pane 74, an X-axis coordinate text box 746 and a Y-axis coordinate text box 747 for editing a variable area, and an add button 748 for adding a variable area are further displayed.

With the user editing the numerical values of the respective text boxes in the area information input pane 74, one or more areas exempt from inspection are reset. As a result, the one or more areas exempt from inspection are changed thereafter according to the set values. Note that the setting of the area to be inspected and area exempt from inspection is not limited to inputting numerical values and may be set through operation on a graphical user interface (GUI) screen.

Fifth Embodiment

Only the area to be inspected may be cut out and saved as an image file. This allows for reducing the total file size of the inspection result.

Figure 19:
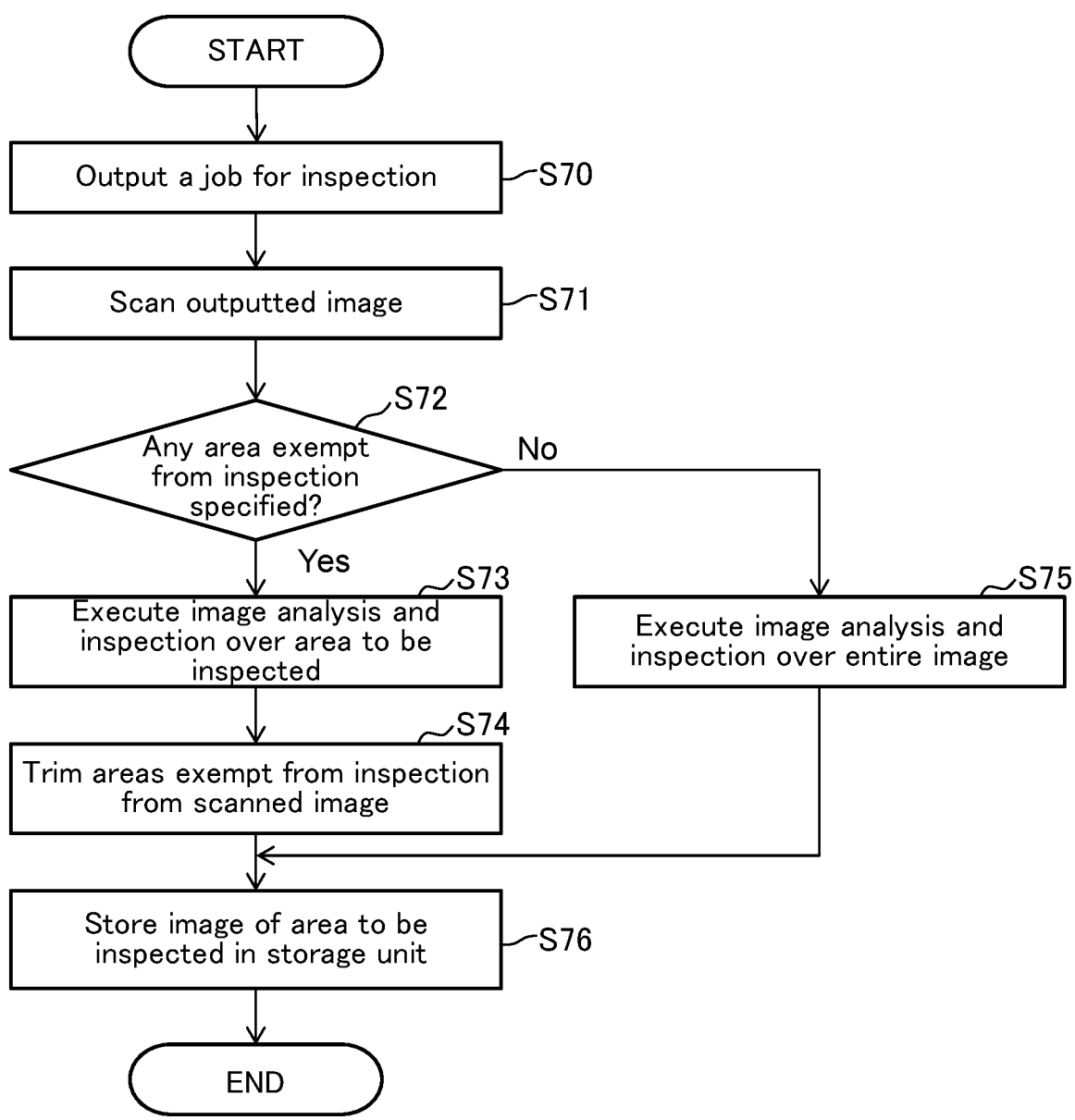
FIG. 19 is a flowchart of a process to trim the area exempt from inspection from an image obtained by scanning a printed recording medium.

FIG. 19 is a flowchart of a process to the trim areas exempt from inspection from an image obtained by scanning a printed recording medium. First, the control unit 10 uses the printing unit 130 to output the job for inspection on the paper 9 (S70), and uses the image scanning unit 140 to scan the image outputted on the paper 9 (S71). Next, the control unit 10 determines whether or not any area exempt from inspection is specified in the job for inspection (S72).

If no area exempt from inspection is specified in the job for inspection (No), the control unit 10 uses the abnormality detector 106 to execute image analysis and inspection over the entire image (S75), and proceeds to processing in step S76.

If any area exempt from inspection is specified in the job for inspection (Yes), the control unit 10 uses the abnormality detector 106 to execute image analysis and inspection over the area to be inspected (S73). Next, the control unit 10 uses the image processor 104 to trim the areas exempt from inspection from the scanned image (S74), and proceeds to processing in step S76. Here, the control unit 10 works as the trimmer 109 (see FIG. 3) for the image processor 104 to trim the areas exempt from inspection from the scanned image.

In step S76, the control unit 10 stores the image of the area to be inspected in the storage unit 18, and ends the process in FIG. 19. The image stored here is shown in FIG. 20 to be described below.

Figure 20:
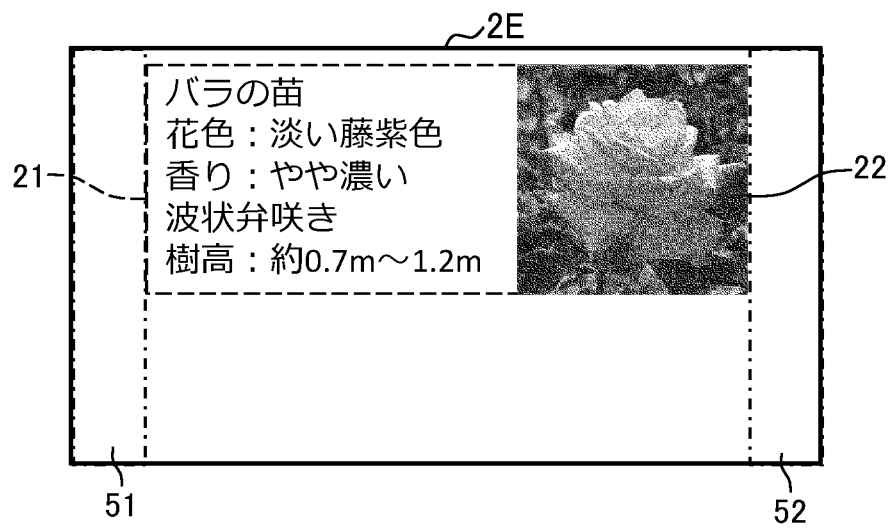
FIG. 20 is a diagram to show an image obtained by scanning a printed recording medium.

FIG. 20 is a diagram to show an image 2E obtained by scanning a printed recording medium. The image 2E includes the text area 21 and the photograph area 22. The left and right ends indicated by dashed lines are the boundary lines 51, 52 for the trimmed areas, respectively. The areas to be inspected in the image 2E are areas excluding the trimmed areas.

Figure 21:
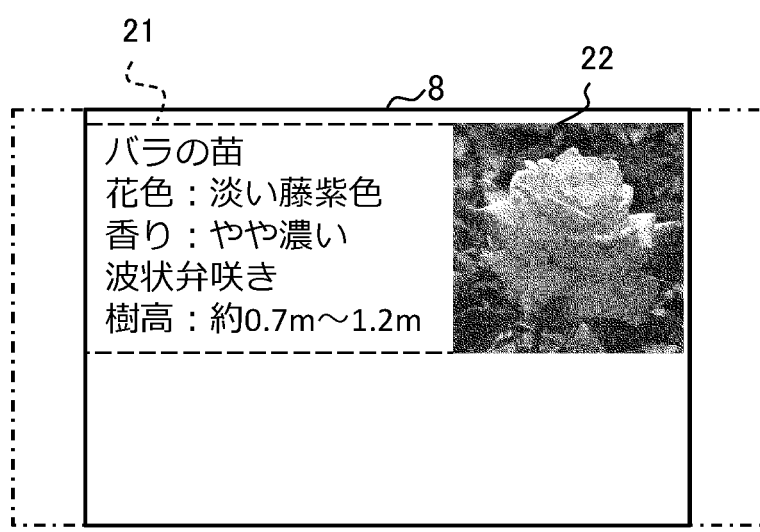
FIG. 21 is a diagram to show a file obtained by trimming areas exempt from inspection from the image obtained by scanning the printed recording medium.

FIG. 21 is a diagram to show a trimmed image 8 obtained by trimming areas exempt from inspection from the image 2 obtained by scanning the printed recording medium. The trimmed image 8 is a stored image of areas of the image 2E, excluding the trimmed areas as areas exempt from inspection. As the areas exempt from inspection are excluded in this manner, the file size of the image to be saved is reduced.

Sixth Embodiment

When the information on the areas exempt from inspection is added as information such as coordinates and the distances from edges of the paper, the user may be informed of the numerical values. In this embodiment, in order for the user to check the really-inspected area, the coordinate information of the areas exempt from inspection is displayed.

Figure 22:
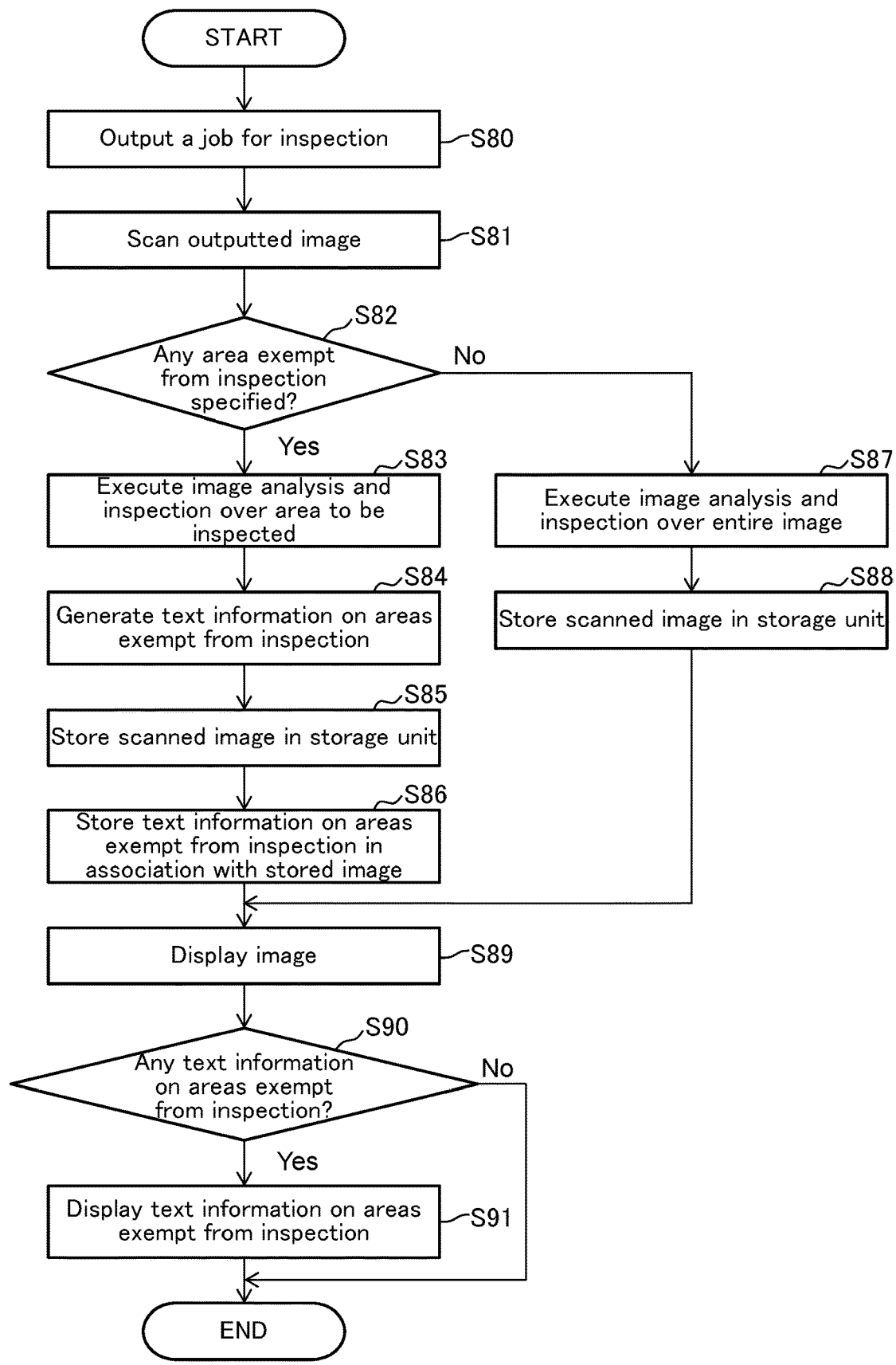
FIG. 22 is a flowchart of a process to display coordinate information of an area exempt from inspection, along with an image obtained by scanning a recording medium.

FIG. 22 is a flowchart of a process to display the coordinate information of the areas exempt from inspection, along with the image obtained by scanning the recording medium. First, the control unit 10 uses the printing unit 130 to output the job for inspection on the paper 9 (S80), and uses the image scanning unit 140 to scan the image outputted on the paper 9 (S81). Next, the control unit 10 determines whether or not any area exempt from inspection is specified in the job for inspection (S82).

If no area exempt from inspection is specified in the job for inspection (No), the control unit 10 uses the abnormality detector 106 to execute image analysis and inspection over the entire image (S87), stores the scanned image in the storage unit 18 (S88), and proceeds to processing in step S89.

If any area exempt from inspection is specified in the job for inspection (Yes), the control unit 10 uses the abnormality detector 106 to execute image analysis and inspection over the area to be inspected (S83), and uses the image processor 104 to generate text information on the area exempt from inspection (S84). Next, the control unit 10 stores the scanned image in the storage unit 18 (S85), stores the text information on the area exempt from inspection in association with the stored image (S86), and proceeds to processing in step S89. Here, such a technique of saving the text information in association with the image may be used, for example, that the image file and the text information file have a common base filename between the two and different file extensions from each other.

In step S89, the control unit 10 uses the display processor 105 to display the stored image. Then, the control unit 10 determines whether or not any text information on the area exempt from inspection exists for (is associated with) the stored image (S90). If any text information on the area exempt from inspection exists for the stored image (Yes), the control unit 10 displays the text information on the area exempt from inspection over the image stored in the storage unit 18 (S91), and ends the process in FIG. 22. This allows for visually displaying the image obtained by scanning the printed paper 9 and the information on the area to be inspected. If no text information on the area exempt from inspection exists for the stored image (No), the control unit 10 ends the process in FIG. 22.

Figure 23:
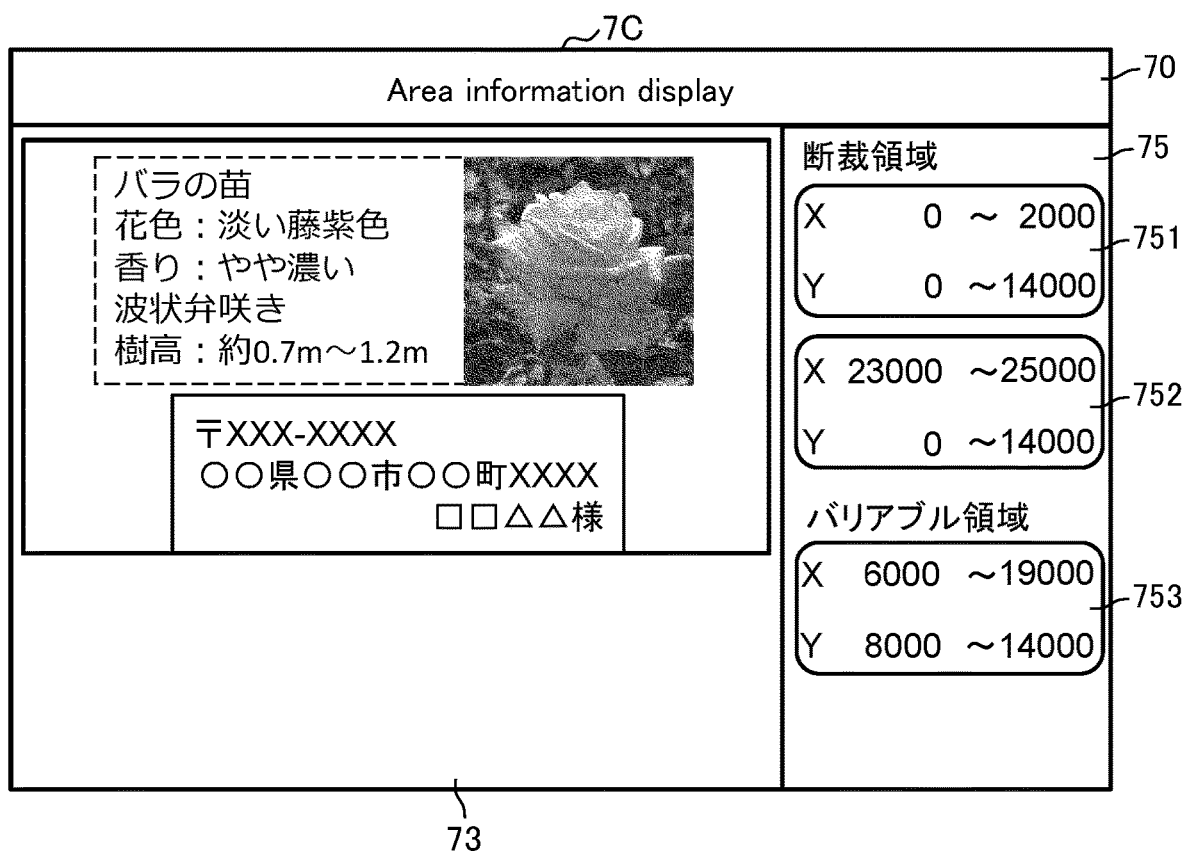
FIG. 23 is a diagram to show a display screen having coordinate information of the area exempt from inspection.

FIG. 23 is a diagram to show a display screen having the coordinate information of the area exempt from inspection. An area information display screen 7C has a wording "area information display" displayed on the title bar 70, the image pane 73 displayed on the lower left, and an area information pane 75 displayed on the lower right. In the area information pane 75, trimmed area coordinate information 751, 752 and variable area coordinate information 753 are displayed.

In the trimmed area coordinate information 751, "X 0 to 2000" and "Y 0 to 14000" are displayed. In the area coordinate information 752, "X 23000 to 25000" and "Y 0 to 14000" are displayed. In the variable area coordinate information 753, "X 6000 to 19000" and "Y 8000 to 14000" are displayed. In this manner, the information on the area exempt from inspection may be displayed with the coordinate values (numerical values).

Modifications

The present invention is not limited to the above-described embodiments, and can be modified and implemented within the scope of the present invention, described as follows in a) to f), for example.

a) The trimmed areas exempt from inspection may be displayed such as 10 mm from the leading edge of the paper and 7 mm from the trailing edge of the paper, and there is no limitation in a style of specifying the range of the area.

b) The information on the area to be inspected and area exempt from inspection may be not only registered in another layer of the image, or stored in a text file and then associated with the image file, but also registered in tag information of the image file. Alternatively, information on the area to be inspected and/or area exempt from inspection may be superimposed, in characters, on the scanned image and stored.

c) The technique of associating the image file with the area exempt from inspection is not limited to using the same base filename.

d) When only the image to be inspected in the image is saved, only the trimmed areas may be trimmed and the variable area may remain. This allows for eliminating the parts to be trimmed and not remaining on the product, and for storing, as the inspection result, the variable area remaining as a part of the product.

e) The switching between displaying the original image scanned by the image scanning unit and displaying the image obtained by superimposing the graphic, indicating the area to be inspected or the area exempt from inspection, on the original image is not limited to mechanically switching in a predetermined cycle. For example, displaying may be switched by pressing a switching button as a trigger.

f) The image processor may superimpose the graphic, indicating the area to be inspected or the area exempt from inspection, on the same layer as the image scanned by the image scanning unit, and associate the superimposed image with the original image scanned by the image scanning unit for a management purpose.

LEGEND FOR REFERENCE NUMERALS

1: image forming system, 10: control unit, 101: CPU, 102: ROM, 103: RAM, 104: image processor, 105: display processor (area indicator), 106: Abnormality detector, 107: operation controller, 108: corrector, 109: trimmer, 11: display operation unit, 12: paper feeding unit, 121 to 123: large-capacity paper feeding stages, 13: image forming device, 130: printing unit, 131, 132: inside paper feeding stages, 133: transport roller, 134: transfer roller, 135: fixing roller, 136,137: reversing paths, 14: image inspection device, 140: image scanning unit, 141, 142: optical sensors, 143: roller, 15: trimming device, 150: trimming unit, 151 to 153: trimming cutters, 154: waste bin, 16: purging device, 160: purging unit, 161: main catch tray, 162: sub catch tray, 163: transport path switching unit, 18: storage unit, 19: communication unit, 2, 2A to 2E: images, 21: text area, 22: photograph area, 23: variable area, 3: layer, 31, 32: trimmed areas, 33: variable area, 4: layer, 41: area to be inspected, 5: boundary line layer, 51 to 53: boundary lines, 7: area-to-be-inspected screen, 7B: area reset screen, 7C: area information display screen, 70: title bar, 71: area reset button, 73: image pane, 74: area information input pane, 741, 743, 746: X-axis coordinate text box, 742, 744, 747: Y-axis coordinate text box, 745,748: add button, 75: area information pane, 751, 752: trimmed area coordinate information, 753: variable area coordinate information, 8: trimmed image, and 9: paper.

What is claimed is:

1. An image forming system comprising:
a processor to inspect whether or not a printing result is normal based on a comparison of an image previously scanned by an image scanner that scans an image on a recording medium to an image scanned by the image scanner when a print job is executed; and
a display,
wherein the processor displays the image scanned by the image scanner, a first boundary line, and a second boundary line on the display,
wherein the first boundary line indicates a boundary between an area to be inspected and a first area exempt from inspection,
wherein the second boundary line indicates a boundary between the area to be inspected and a second area exempt from inspection, and
wherein the area to be inspected, the first area exempt from inspection, and the second area exempt from inspection are not filled with solid color.

2. The image forming system as claimed in claim 1, wherein the area to be inspected, the first area exempt from inspection, and the second area exempt from inspection being not filled with solid color includes a case where the area to be inspected, the first area exempt from inspection, and the second area exempt from inspection have no color fill-in.

3. The image forming system as claimed in claim 1, wherein the processor displays the first boundary line and the second boundary line in the image scanned by the image scanner when the print job is executed.

4. The image forming system as claimed in claim 1, wherein the first area exempt from inspection includes a variable area.

5. The image forming system as claimed in claim 1, wherein one of the first area exempt from inspection or the second area exempt from inspection includes an area having different print contents for each recording medium.

6. The image forming system as claimed in claim 1, wherein the first area exempt from inspection and the second area exempt from inspection are areas where the processor does not inspect whether or not a printing result is normal based on the comparison of an image previously scanned by the image scanner that scans an image on a recording medium to an image scanned by the image scanner when a print job is executed.

7. An image forming method comprising:
inspecting, by a processor, whether or not a printing result is normal based on a comparison of an image previously scanned by an image scanner that scans an image on a recording medium to an image scanned by the image scanner when a print job is executed; and
displaying, by a display, the image scanned by the image scanner, a first boundary line, and a second boundary line,
wherein the first boundary line indicates a boundary between an area to be inspected and a first area exempt from inspection,
wherein the second boundary line indicates a boundary between the area to be inspected and a second area exempt from inspection, and
wherein the area to be inspected, the first area exempt from inspection, and the second area exempt from inspection are not filled with solid color.

8. The image forming method as claimed in claim 7, wherein the area to be inspected, the first area exempt from inspection, and the second area exempt from inspection being not filled with solid color includes a case where the area to be inspected, the first area exempt from inspection, and the second area exempt from inspection have no color fill-in.

9. The image forming method as claimed in claim 7, further comprising displaying, by the display, the first boundary line and the second boundary line in the image scanned by the image scanner when the print job is executed.

10. The image forming method as claimed in claim 7, wherein the first area exempt from inspection includes a variable area.

11. The image forming method as claimed in claim 7, wherein one of the first area exempt from inspection or the second area exempt from inspection includes an area having different print contents for each recording medium.

12. The image forming method as claimed in claim 7, wherein the first area exempt from inspection and the second area exempt from inspection are areas where the processor does not inspect whether or not a printing result is normal based on the comparison of an image previously scanned by the image scanner that scans an image on a recording medium to an image scanned by the image scanner when a print job is executed.

13. A non-transitory computer-readable medium used for image forming, storing computer-executable instructions which, when executed by a processor, cause the processor to perform operations comprising:
  inspecting whether or not a printing result is normal based on a comparison of an image previously scanned by an image scanner that scans an image on a recording medium to an image scanned by the image scanner when a print job is executed; and
  displaying, by a display, the image scanned by the image scanner, a first boundary line, and a second boundary line,
  wherein the first boundary line indicates a boundary between an area to be inspected and a first area exempt from inspection,
  wherein the second boundary line indicates a boundary between the area to be inspected and a second area exempt from inspection, and
  wherein the area to be inspected, the first area exempt from inspection, and the second area exempt from inspection are not filled with solid color.

14. The non-transitory computer-readable medium used for image forming as claimed in claim 13, wherein the area to be inspected, the first area exempt from inspection, and the second area exempt from inspection being not filled with solid color includes a case where the area to be inspected, the first area exempt from inspection, and the second area exempt from inspection have no color fill-in.

15. The non-transitory computer-readable medium used for image forming as claimed in claim 13, wherein the operations further comprise displaying, by the display, the first boundary line and the second boundary line in the image scanned by the image scanner when the print job is executed.

16. The non-transitory computer-readable medium used for image forming as claimed in claim 13, wherein the first area exempt from inspection includes a variable area.

17. The non-transitory computer-readable medium used for image forming as claimed in claim 13, wherein one of the first area exempt from inspection or the second area exempt from inspection includes an area having different print contents for each recording medium.

18. The non-transitory computer-readable medium used for image forming as claimed in claim 13, wherein the first area exempt from inspection and the second area exempt from inspection are areas where the processor does not inspect whether or not a printing result is normal based on the comparison of an image previously scanned by the image scanner that scans an image on a recording medium to an image scanned by the image scanner when a print job is executed.

19. An image inspection apparatus comprising:
  an abnormality detector configured to inspect whether or not a printing result is normal based on a comparison of an image previously scanned by an image scanner that scans an image on a recording medium to an image scanned by the image scanner when a print job is executed; and
  an area indicator configured to display a first boundary line and a second boundary line,
  wherein the area indicator displays the first boundary line and the second boundary line in the image scanned by the image scanner,
  wherein the first boundary line indicates a boundary between an area to be inspected and a first area exempt from inspection,
  wherein the second boundary line indicates a boundary between the area to be inspected and a second area exempt from inspection, and
  wherein the area to be inspected, the first area exempt from inspection, and the second area exempt from inspection are not filled with solid color.

20. The image inspection apparatus as claimed in claim 19, wherein the area to be inspected, the first area exempt from inspection, and the second area exempt from inspection being not filled with solid color includes a case where the area to be inspected, the first area exempt from inspection, and the second area exempt from inspection have no color fill-in.

21. The image inspection apparatus as claimed in claim 19, wherein the area indicator displays the first boundary line and the second boundary line in the image scanned by the image scanner when the print job is executed.

22. The image inspection apparatus as claimed in claim 19, wherein the first area exempt from inspection includes a variable area.

23. The image inspection apparatus as claimed in claim 19, wherein one of the first area exempt from inspection or the second area exempt from inspection includes an area having different print contents for each recording medium.

24. The image inspection apparatus as claimed in claim 19, wherein the first area exempt from inspection and the second area exempt from inspection are areas where the abnormality detector does not inspect whether or not a printing result is normal based on the comparison of an image previously scanned by the image scanner that scans an image on a recording medium to an image scanned by the image scanner when a print job is executed.

25. An image forming system comprising:
  a processor to inspect whether or not a printing result is normal based on a comparison of an image previously scanned by an image scanner that scans an image on a recording medium to an image scanned by the image scanner when a print job is executed; and
  a display,
  wherein the processor displays the image scanned by the image scanner, a first boundary line, and a second boundary line on the display,
  wherein the first boundary line indicates a boundary between an area to be inspected and a first area exempt from inspection,
  wherein the second boundary line indicates a boundary between the area to be inspected and a second area exempt from inspection, and
  wherein the area to be inspected, the first area exempt from inspection, and the second area exempt from inspection, while being displayed with the first boundary line and the second boundary line, each include respective portions of the scanned image capable of being visually inspected.

* * * * *